(12) United States Patent
Brehmer et al.

(10) Patent No.: US 8,574,114 B2
(45) Date of Patent: Nov. 5, 2013

(54) 10-GEAR AUTOMATIC TRANSMISSION

(71) Applicant: ZF Friedrichshafen AG, Friedrichshafen (DE)

(72) Inventors: Martin Brehmer, Tettnang (DE); Gabor Diosi, Friedrichshafen (DE); Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/852,589

(22) Filed: Mar. 28, 2013

(65) Prior Publication Data

US 2013/0237364 A1    Sep. 12, 2013

Related U.S. Application Data

(62) Division of application No. 12/747,755, filed as application No. PCT/EP2008/066975 on Dec. 8, 2008, now Pat. No. 8,465,390.

(30) Foreign Application Priority Data

Dec. 14, 2007    (DE) .................... 10 2007 055 808

(51) Int. Cl.
    *F16H 3/66*    (2006.01)
(52) U.S. Cl.
    USPC ..................... 475/282; 475/288; 475/330
(58) Field of Classification Search
    USPC ................... 475/280, 282, 288, 330
    See application file for complete search history.

(56) References Cited

U.S. PATENT DOCUMENTS

| | | |
|---|---|---|
| 4,395,925 A | 8/1983 | Gaus |
| 5,106,352 A | 4/1992 | Lepelletier |
| 6,558,287 B2 | 5/2003 | Hayabuchi et al. |
| 6,572,507 B1 | 6/2003 | Korkmaz et al. |
| 6,634,980 B1 | 10/2003 | Ziemer |
| 6,811,512 B2 | 11/2004 | Usoro et al. |
| 6,860,831 B2 | 3/2005 | Ziemer |
| 6,955,627 B2 | 10/2005 | Thomas et al. |
| 6,960,149 B2 | 11/2005 | Ziemer |
| 6,991,578 B2 | 1/2006 | Ziemer |
| 7,549,942 B2 | 6/2009 | Gumpoltsberger |

(Continued)

FOREIGN PATENT DOCUMENTS

| | | |
|---|---|---|
| DE | 29 36 969 A1 | 4/1981 |
| DE | 199 12 480 A1 | 9/2000 |

(Continued)

OTHER PUBLICATIONS

Gumpoltsberger, Gerhard: Systematic Synthesis and Evaluation of Multi-stage Planetary Transmissions, Dissertation TU Chemnitz, 2007.

(Continued)

*Primary Examiner* — Justin Holmes
*Assistant Examiner* — Jacob S Scott
(74) *Attorney, Agent, or Firm* — Davis & Bujold, PLLC; Michael J. Bujold

(57) ABSTRACT

The invention concerns an automatic transmission of planetary structure, comprising a drive input shaft (AN), a drive output shaft (AB), first, second, third and fourth planetary gear sets (RS1, RS2, RS3, RS4) and six shifting element (A, B, C, D, E, F). By the selective engagement of three of a total of six shifting elements (A to F), ten forward gears and up to two reverse gears can be engaged without range shifts.

14 Claims, 14 Drawing Sheets

(56) References Cited

U.S. PATENT DOCUMENTS

| | | |
|---|---|---|
| 7,556,582 B2 | 7/2009 | Gumpoltsberger |
| 7,566,283 B2 | 7/2009 | Gumpoltsberger |
| 7,651,431 B2 | 1/2010 | Phillips et al. |
| 7,691,024 B2 | 4/2010 | Phillips et al. |
| 7,699,743 B2 | 4/2010 | Diosi et al. |
| 7,704,181 B2 | 4/2010 | Phillips et al. |
| 7,722,496 B2 | 5/2010 | Phillips et al. |
| 7,828,690 B2 | 11/2010 | Wittkopp et al. |
| 7,892,137 B2 | 2/2011 | Kamm et al. |
| 7,909,726 B2 | 3/2011 | Phillips et al. |
| 7,914,414 B2 | 3/2011 | Phillips et al. |
| 7,988,586 B2 | 8/2011 | Phillips et al. |
| 7,993,237 B2 | 8/2011 | Wittkopp et al. |
| 8,007,394 B2 | 8/2011 | Phillips et al. |
| 8,007,395 B2 | 8/2011 | Wittkopp et al. |
| 8,007,398 B2 | 8/2011 | Phillips et al. |
| 8,047,951 B2 | 11/2011 | Wittkopp et al. |
| 8,052,567 B2 | 11/2011 | Hart et al. |
| 8,157,697 B2 | 4/2012 | Hart et al. |
| 8,202,190 B2 | 6/2012 | Phillips et al. |
| 2008/0161149 A1 | 7/2008 | Diosi et al. |
| 2009/0011891 A1 | 1/2009 | Phillips et al. |
| 2010/0048344 A1 | 2/2010 | Kamm et al. |
| 2011/0009228 A1 | 1/2011 | Bauknecht et al. |

FOREIGN PATENT DOCUMENTS

| | | |
|---|---|---|
| DE | 199 49 507 A1 | 4/2001 |
| DE | 101 15 983 A1 | 10/2002 |
| DE | 101 15 987 A1 | 10/2002 |
| DE | 101 15 995 A1 | 10/2002 |
| DE | 102 13 820 A1 | 10/2002 |
| DE | 10 2005 010 837 A1 | 9/2005 |
| DE | 10 2004 040 597 A1 | 2/2006 |
| DE | 10 2005 002 337 A1 | 8/2006 |
| DE | 10 2005 010 210 A1 | 9/2006 |
| DE | 102005 032 881 A1 | 1/2007 |
| DE | 10 2006 006 622 A1 | 9/2007 |
| DE | 10 2006 006 636 A1 | 9/2007 |
| DE | 10 2006 006 637 A1 | 9/2007 |
| DE | 10 2008 007 574 A1 | 8/2008 |
| DE | 10 2008 016 084 A1 | 10/2008 |
| DE | 10 2008 000 428 A1 | 9/2009 |
| EP | 0 434 525 A1 | 6/1991 |
| JP | 2005-61445 A | 3/2005 |
| JP | 2006-349153 A | 12/2006 |
| WO | 02/079669 A1 | 10/2002 |
| WO | 2006/074707 A1 | 7/2006 |

OTHER PUBLICATIONS

Gumpoltsberger, Gerhard: Synthesis of Planetary Transmissions, ZF Friedrichshafen AG, 2009, 13 pages, Germany.

| GEAR | BRAKE | | CLUTCH | | | | RATIO $i$ | GEAR STEP $\varphi$ |
|---|---|---|---|---|---|---|---|---|
| | A | B | C | D | E | F | | |
| 1 | ● | ● | ● | | | | 4.699 | |
| | | | | | | | | 1.500 |
| 2 | ● | ● | | | ● | | 3.134 | |
| | | | | | | | | 1.489 |
| 3 | | ● | ● | | ● | | 2.104 | |
| | | | | | | | | 1.263 |
| 4 | | ● | | ● | ● | | 1.667 | |
| | | | | | | | | 1.297 |
| 5 | | ● | ● | ● | | | 1.285 | |
| | | | | | | | | 1.039 |
| 6 | | ● | ● | | | ● | 1.238 | |
| | | | | | | | | 1.238 |
| 7 | | | ● | | ● | ● | 1.000 | |
| | | | | | | | | 1.151 |
| 8 | ● | | ● | | | ● | 0.869 | |
| | | | | | | | | 1.036 |
| 9 | ● | | ● | ● | | | 0.839 | |
| | | | | | | | | 1.258 |
| 10 | ● | | | ● | ● | | 0.667 | |
| R1 | ● | ● | | ● | | | −3.280 | TOTAL 7.049 |
| R2 | ● | ● | | | | ● | −5.013 | |

Fig. 2

10-GEAR AUTOMATIC TRANSMISSION

This application is a divisional of U.S. patent application Ser. No. 12/747,755 filed Jun. 11, 2010, which is a National Stage completion of PCT/EP2008/066975 filed Dec. 8, 2008, which claims priority from German patent application serial no. 10 2007 055 808.4 filed Dec. 14, 2007.

FIELD OF THE INVENTION

The present invention concerns a 10-gear automatic transmission of planetary structure, in particular for a motor vehicle.

BACKGROUND OF THE INVENTION

According to the prior art, automatic transmissions, in particular for motor vehicles, comprise planetary gearsets which are shifted by means of frictional or shifting elements such as clutches and brakes and which are usually connected with a starting element that can operate with slip and is optionally provided with a bridging clutch, such as a hydrodynamic torque converter or a flow clutch.

Automatically shifted vehicle transmissions of planetary structure in general have been described many times in the prior art and are constantly undergoing further development and improvement. Such transmissions should have a sufficient number of forward gears and a reverse gear, and transmission ratios that are very well suited for motor vehicles and have a large overall spread and appropriate step intervals. Furthermore, they should enable a high starting transmission ratio in the forward direction and should possess a direct gear and be suitable for use both in passenger cars and in utility vehicles. In addition these transmissions should entail as little structural complexity and cost as possible, in particular requiring only a small number of shifting elements, and should avoid double shifts for sequential shifting operations so that for shifts in defined gear groups in each case only one shifting element is changed.

A multi-gear automatic transmission of this type is described, for example in WO 2006/074707 A1 by the present applicant. It comprises essentially a drive input shaft and a drive output shaft arranged coaxially with one another, a total of four single planetary gearsets and five frictional shifting elements. By selective engagement in each case of three of the five frictional shifting elements made as clutches and brakes a total of eight forward gears can be engaged without group shifts, i.e. they can be engaged or disengaged in such manner that on changing from one gear to the next-higher or next-lower gear, in each case only one of the previously engaged shifting elements is disengaged and one previously disengaged shifting element is engaged.

SUMMARY OF THE INVENTION

The purpose of the present invention is to propose a multi-step transmission of the type mentioned at the start, with at least ten forward gears that can be engaged without group shifts and at least one reverse gear, in which, using a total of four planetary gearsets, the least possible number of shifting elements is needed. In addition the transmission should be characterized by a large spread in relation to gear steps acceptable for drivability, and in the main driving gears, by good efficiency, i.e. comparatively low drag and gearing losses.

According to these, an automatic transmission of planetary structure is proposed according to the invention, which comprises a drive input shaft, a drive output shaft, four planetary gearsets and only six shifting elements, namely two brakes and four clutches, whose selective engagement gives various transmission ratios between the drive input and the drive output shafts, such that ten forward gears and at least one reverse gear can be produced. In each gear, three of the total of six shifting elements are engaged. To change from one gear to the next-higher or next-lower gear, in each case only one of the previously engaged shifting elements is disengaged and one previously disengaged shifting element is engaged.

Preferably, the drive output shaft of the transmission is rigidly connected to an element of one of the four planetary gearsets and rigidly connected to the output elements of two of the transmission's shifting elements, such that one of these two shifting elements connected on their output side to the drive output shaft is rigidly connected on its input side with another element of this planetary gearset rigidly connected to the drive output shaft.

In an advantageous design the sixth shifting element is suitable for producing a hill-holder function in the transmission, by virtue of which, with the shifting element engaged at the same time, the drive output shaft can be locked in the transmission.

In a preferred embodiment the automatic transmission according to the invention comprises the following kinematic couplings of the gearset elements to one another and to the drive input and drive output shafts:

the fourth planetary gearset is rigidly connected to the drive input shaft, is connected rigidly in each case by an active connection to the first and second planetary gearsets, and can be connected by means of the first shifting element to a housing of the transmission, the third planetary gearset is rigidly connected to the drive output shaft, is connected rigidly in each case by an active connection to the first and second planetary gearsets, and can be connected by the fourth shifting element to the second planetary gearset, the second planetary gearset can be blocked by the fifth shifting element and can be connected by the sixth shifting element to the first and third planetary gearsets, the first planetary gearset can be connected to the housing by the first shifting element and by the second shifting element.

By virtue of these various kinematic couplings of the shifting elements to the various shafts of the automatic transmission, according to the invention an entire gear family is obtained.

A number of advantageous designs of an automatic transmission of this type according to the invention are based on the 8-gear automatic transmissions known from WO 2006/074707 A1 with the following kinematic couplings of the gearset elements to one another: A carrier of the fourth planetary gearset and the drive input shaft are connected in a rotationally fixed manner to one another and form the first rotary shaft of the transmission. A carrier of the third planetary gearset and the drive output shaft are connected in a rotationally fixed manner to one another and form the second rotary shaft of the transmission. A sun gear of the first planetary gearset and a sun gear of the fourth planetary gearset are connected in a rotationally fixed manner to one another and form the third rotary shaft of the transmission. A ring gear of the first planetary gearset forms the fourth rotary shaft of the transmission. A ring gear of the second planetary gearset and a sun gear of the third planetary gearset are connected in a rotationally fixed manner to one another and form the fifth rotary shaft of the transmission. A carrier of the first planetary gearset and a ring gear of the third planetary gearset are connected in a rotationally fixed manner to one another and form the sixth rotary shaft of the transmission. A sun gear of the second planetary gearset and a ring gear of the fourth planetary gearset are connected in a rotationally fixed manner to one another and form the seventh rotary shaft of the transmission. A carrier of the second planetary gearset forms the eighth rotary shaft of the transmission. The above gearset kinematic system is identical to the gearset kinematic system of the 8-gear automatic transmission known from WO 2006/074707 A1.

With regard to the connection of the six shifting elements to the various elements of the planetary gearsets and to the drive input shaft in this preferred embodiment of an automatic transmission according to the invention, it is provided that the first shifting element is arranged in the force flow between the third shaft and a housing of the transmission, the second shifting element in the force flow between the fourth shaft and the housing of the transmission, and the third shifting element in the force flow between the fifth and the first shaft. In addition the fourth shifting element is arranged in the force flow between the eighth and the first shaft and that the fifth shifting element is arranged in the force flow either between the seventh and the fifth shaft or between the seventh and the eighth shaft or between the fifth and the eighth shaft. The sixth shifting element according to the invention, which is an additional one compared with WO 2006/074707 A1, is arranged in the force flow between the sixth and the eighth shafts. By virtue of the various kinematic couplings of the fifth shifting element to the various shafts of the automatic transmission, here too a gear family is obtained.

The shifting or gear logic of this advantageous automatic gear family according to the invention is as follows: In the first forward gear the first, second and third shifting elements are engaged and transmit torque. In the second forward gear the first, second and fifth shifting elements are engaged and transmit torque. In the third forward gear the second, third and fifth shifting elements are engaged and transmit torque. In the fourth forward gear the second, fourth and fifth shifting elements are engaged and transmit torque. In the fifth forward gear the second, third and fourth shifting elements are engaged and transmit torque. In the sixth forward gear the second, third and sixth shifting elements are engaged and transmit torque. In the seventh forward gear the third, fifth and sixth shifting elements are engaged and transmit torque. In the eighth forward gear the first, third and sixth shifting elements are engaged and transmit torque. In the ninth forward gear the first, third and fourth shifting elements are engaged and transmit torque. In the tenth forward gear the first, fourth and fifth shifting elements are engaged and transmit torque. A reverse gear is obtained by engaging the first, second and fourth shifting elements or by engaging the first, second and sixth shifting elements.

In contrast to the 8-gear automatic transmission known from WO 2006/074707 A1, because of the sixth shifting element, which is additional in comparison with WO 2006/074707 A1, the automatic gear family according to the invention now has a hill-holder function in the transmission: if the first, second, fourth and sixth shifting elements are all engaged at the same time, the drive output shaft of the automatic transmission is fixed or blocked relative to the transmission housing.

All four of the planetary gearsets are preferably designed as so-termed negative planetary gearsets, whose respective planetary gears mesh with the sun gear and the ring gear of the planetary gearset concerned. With regard to the spatial arrangement of the four planetary gearsets in the housing of the automatic transmission, in one design version it is proposed to arrange all four of the planetary gearsets coaxially and next to one another in the defined sequence "first, fourth, second and third planetary gearset", which makes it possible for all four of the planetary gearsets each to have at most one shaft of the transmission passing centrally through it. For an application with the drive input and drive output shafts extending coaxially with one another, it is appropriate in this case for the first planetary gearset to be that planetary gearset of the planetary gearset group which faces toward the drive input of the automatic transmission. In another design, with regard to the spatial arrangement of the four planetary gearsets in the housing of the automatic transmission, it is proposed to arrange all four planetary gearsets coaxially and next to one another in the defined sequence "second, fourth, first and third planetary gearset". A more compact transmission structure is obtained with this design in particular if, viewed spatially, the fourth and sixth shifting elements are arranged in an area axially between the first and third planetary gearsets. For an application with the drive input and drive output shafts positioned coaxially with one another, in this case it is appropriate for the second planetary gearset to be that planetary gearset of the planetary gearset group which faces toward the drive input of the automatic transmission.

Particularly for passenger automobiles, all the proposed embodiments and designs for a 10-gear automatic transmission according to the invention have suitable transmission ratios with a very large overall spread in relation to the gear steps acceptable for drivability, and this results in a significant reduction of fuel consumption. Furthermore, the 10-gear automatic transmission according to the invention is characterized by an extraordinarily small number of shifting elements for the number of gears—namely two brakes and four clutches—and comparatively little structural complexity. In addition, with the 10-gear automatic transmission according to the invention the efficiency is high in all the gears, because of low drag losses since in every gear three of the six shifting elements are engaged, and due to low gearing losses in the simply constructed single planetary gearsets.

Advantageously, with the 10-gear automatic transmission according to the invention the motor vehicle can be started both by means of a starting element external to the transmission and with a transmission-internal frictional shifting element. In a manner known per se, a transmission-external starting element can for example be in the form of a hydrodynamic converter, a so-termed dry starting clutch, a so-termed wet starting clutch, a magnetic powder clutch, or a centrifugal force clutch. Alternatively to arranging such a starting element in the force flow direction between the drive engine and the transmission, the transmission-external starting element can also be positioned in the force flow direction behind the transmission and in that case the transmission input shaft is connected in a rotationally fixed manner or with some rotational elasticity, to the crankshaft of the drive engine. Particularly suitable as a transmission-internal starting element is one of the two brakes, which is actuated in the first and second forward gears and in the reverse gear.

Furthermore, the 10-gear automatic transmission according to the invention is designed to be adaptable to various drivetrain designs, both in the force flow direction and in relation to the space available. Thus, with the same transmission layout, depending on the fixed transmission ratio of the individual planetary gearsets different gear intervals can be obtained, so enabling application-specific or vehicle-specific variation. Moreover, without special design measures the drive input and drive output of the transmission can optionally be arranged coaxially or axis-parallel to one another. An axle differential and/or a distributor differential can be arranged on the drive input side or the drive output side of the transmission. It is also possible to provide additional freewheels at any suitable points of the multi-step transmission, for example between a shaft and the housing or if necessary to connect two shafts. In addition a wear-free brake such as a hydraulic or electrical retarder or suchlike can be arranged on any shaft, preferably on the drive input or the drive output shaft, and this is especially important particularly for use in utility vehicles. Furthermore, for powering additional aggregates, an auxiliary drive output can be provided on any shaft, preferably on the drive input or the drive output shaft. Another advantage of the automatic transmission according to the invention is that an electric machine can also be coupled to any shaft as a generator and/or as an additional drive motor.

The shifting elements used can be in the form of shift-under-load clutches or brakes. In particular frictional clutches or brakes such as disk clutches, belt brakes and/or conical clutches can be used. However, interlocking brakes and/or clutches such as synchronizers or claw brakes can also be used as shifting elements.

BRIEF DESCRIPTION OF THE DRAWINGS

Below, examples of the invention are explained in more detail with reference to the drawings, in which the same or comparable components are identified by the same indexes and which show.

DETAILED DESCRIPTION OF THE PREFERRED EMBODIMENTS

Figure 1:
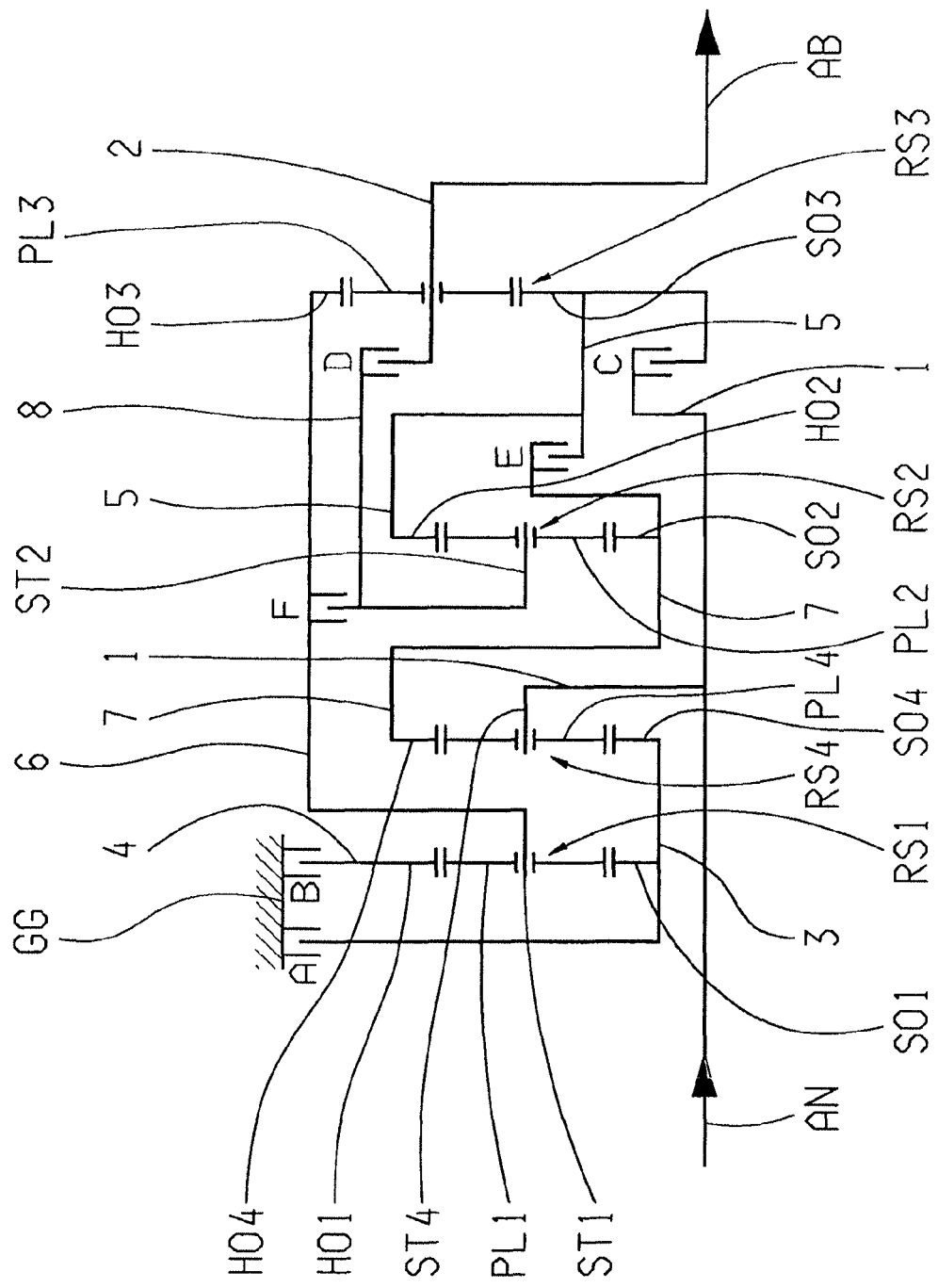
FIG. 1. Schematic representation of a first example embodiment of a 10-gear automatic transmission according to the invention FIG. 2. Illustration of a shifting scheme for the transmission shown in FIG. 1

FIG. 1 shows a simplified, schematic representation of a first example embodiment of a 10-gear automatic transmission according to the invention. The transmission comprises a drive input shaft AN, a drive output shaft AB, four planetary gearsets RS1, RS2, RS3, RS4 and six shifting elements A, B, C, D, E, F, all arranged in a housing GG of the transmission. All four of the planetary gearsets RS1, RS2, RS3, RS4 are formed as simple negative planetary gearsets. As is known, a negative planetary gearset has planetary gears that mesh with the sun gear and the ring gear of the planetary gearset. The ring gears of the four planetary gearsets RS1, RS2, RS3, RS4 are indexed HO1, HO2, HO3 and HO4, their sun gears SO1, SO2, SO3 and SO4, the planetary gears PL1, PL2, PL3, and PL4, and the carriers on which the planetary gears are mounted to rotate are indexed ST1, ST2, ST3 and ST4. The automatic transmission according to the invention comprises a total of eight rotary shafts indexed from 1 to 8.

The shifting elements A and B are in the form of brakes which, in the example embodiment shown, are both frictional shifting disk brakes but which, in other designs, could also be made as frictional shifting belt brakes or for example even as interlock-type shifting claw or cone brakes. The shifting elements C, D, E and F are clutches which, in the example embodiment shown, are all made as frictional shifting disk clutches but which, in another design, could for example also be interlock-type shifting claw or cone clutches. With this total of six shifting elements A to F, selective engagement of ten forward gears and up to two reverse gears can be obtained, as will be explained in more detail later with reference to FIG. 2.

As regards the coupling of the individual elements of the four planetary gearsets RS1, RS2, RS3, RS4 to one another and to the drive input and drive output shafts AN, AB, the following provisions are made in the automatic transmission according to FIG. 1: The carrier ST4 of the fourth planetary gearset RS4 and the drive input shaft AN are connected in a rotationally fixed manner to one another and form the first shaft of the automatic transmission, indexed 1. The carrier ST3 of the third planetary gearset RS3 and the drive output shaft AB are connected in a rotationally fixed manner to one another and form the second shaft of the automatic transmission, indexed 2. The sun gear SO1 of the first planetary gearset RS1 and the sun gear SO4 of the fourth planetary gearset RS4 are connected in a rotationally fixed manner to one another and form the third shaft of the automatic transmission, indexed 3. The ring gear HO1 of the first planetary gearset RS1 forms the fourth shaft of the automatic transmission, indexed 4. The ring gear HO2 of the second planetary gearset RS2 and the sun gear SO3 of the third planetary gearset RS3 are connected in a rotationally fixed manner to one another and form the fifth shaft of the automatic transmission, indexed 5. The carrier ST1 of the first planetary gearset RS1 and the ring gear HO3 of third planetary gearset RS3 are connected in a rotationally fixed manner to one another and form the sixth shaft of the automatic transmission, indexed 6. The sun gear SO2 of the second planetary gearset RS2 and the ring gear HO4 of the fourth planetary gearset RS4 are connected in a rotationally fixed manner to one another and form the seventh shaft of the automatic transmission, indexed 7. The carrier ST2 of the second planetary gearset forms the eighth shaft of the automatic transmission, indexed 8.

As regards the coupling of the six shifting elements A to F to the above-described shafts 1 to 8 of the transmission, in the automatic transmission according to the invention shown in FIG. 1 the following provisions are made: The first shifting element A is arranged in the force flow between the third shaft 3 and the transmission housing GG. The second shifting element B is arranged in the force flow between the fourth shaft 4 and the transmission housing GG. The third shifting element C is arranged in the force flow between the fifth shaft 5 and the first shaft 1. The fourth shifting element D is arranged in the force flow between the eighth shaft 8 and the second shaft 2. The fifth shifting element E is arranged in the force flow between the seventh shaft 7 and the fifth shaft 5. Finally, the sixth shifting element F is arranged in the force flow between the sixth shaft 6 and the eighth shaft 8.

In the example embodiment shown in FIG. 1 the four planetary gearsets RS1, RS2, RS3, RS4, as viewed in the axial direction, are arranged coaxially one after another in the defined sequence "RS1, RS4, RS2, RS3", with the drive input shaft AN and drive output shaft AB arranged coaxially with one another, the first planetary gearset RS1 being the gearset of the automatic transmission closest to the drive input and the third planetary gearset RS3 being the gearset of the automatic transmission closest to the drive output. In an advantageous manner this arrangement is such that only one shaft of the automatic transmission passes centrally in the axial direction through each of the four planetary gearsets RS1, RS2, RS3 and RS4.

In principle, the shifting elements of an automatic transmission according to the invention can be spatially arranged inside the transmission in any desired way, limited only by the dimensions and external shape of the transmission housing GG. Correspondingly, the component configuration shown in FIG. 1 is expressly to be understood as only one of many possible component configuration variants. Those with knowledge of the field will find numerous suggestions, for example in the already-mentioned WO 2006/074707 A1. The example embodiment shown in FIG. 1, on account of its slim housing structure, is well situated for fitting into a motor vehicle with a so-termed "standard drive". The component configuration shown in FIG. 1 is based on the automatic transmission shown in FIG. 4 of WO 2006/074707 A1 and differs from it only in the connection and arrangement of the clutch F which—as already mentioned—is additional compared with WO 2006/074707 A1.

As can be seen in FIG. 1, the two planetary gearsets RS1 and RS4 are directly adjacent. In the example embodiment shown, as viewed spatially the two brakes A, B are arranged axially next to one another in an area above the planetary gearset RS1 in this case close to the drive input, the brake B being arranged, at least partially, radially above the first planetary gearset RS1. Here, for example, the diameters of the disk sets of these two brakes A, B are at least similar. In a simply designed manner the brake A can also be integrated in a housing wall of the transmission housing GG close to the drive input. As already indicated, the spatial arrangement of the two brakes A, B is to be understood only as an example. Thus, to make the axial length of the transmission shorter, in another design it could for example be provided that while the disk sets remain axially adjacent the brake A is positioned at least partially in an area radially over the first planetary gearset RS1 and the brake B at least partially in an area radially over the fourth planetary gearset RS4. In yet another design it could for example be provided that the two brakes A, B are not positioned axially adjacent, but partially or completely radially one above the other.

As can also been seen from FIG. 1, as viewed spatially, the three clutches C, D and E are arranged in an area axially between the second planetary gearset RS2 close to the fourth planetary gearset RS4, and the third planetary gearset RS3 close to the drive output. On the side of the second planetary gearset RS2 facing toward the third planetary gearset RS3 the clutch E is directly adjacent to the second planetary gearset RS2. Viewed spatially, the disk set of the clutch D is positioned approximately radially over the disk set of the clutch C, so that the two clutches C and D are axially adjacent to the third planetary gearset RS3 (on the side thereof that faces toward the second planetary gearset RS2). In this case the shaft 5, which forms the active connection between the ring gear HO2 of the second planetary gearset RS2 and the sun gear SO3 of the third planetary gearset RS3, completely encloses the clutch F in the axial direction so that the clutch E is inside a cylindrical space formed by the shaft 5. Moreover the shaft 8, which forms the active connection between the carrier ST2 of the second planetary gearset RS2 and the clutch D, completely encloses the second planetary gearset RS2 and the clutch E in the axial direction. Thus the clutch E too is inside a cylindrical space formed by the shaft 8. As already indicated, the spatial arrangement of the three clutches C, D and E shown in FIG. 1 is to be understood only as an example. Thus, depending on the fitting space available in the vehicle for installing the transmission, it may be expedient to position the disk set of the clutch D approximately radially over the disk set of the clutch E. In another design the clutch C could for example be arranged axially between the clutch E close to RS2 and the clutch D close to RS3, and in such a case the disk sets of the three clutches E, C and D would preferably be arranged on an at least similar and large diameter, whereby the resulting comparatively large axial extension of this clutch arrangement would not be disadvantageous for a "standard drive" because of the customary cardan tunnel contour of the vehicle.

As already mentioned, only one shaft of the transmission passes centrally through each of the four planetary gearsets RS1 to RS4 in the axial direction. To be specific, only the drive input shaft AN or the shaft 1 passes centrally completely through the planetary gearsets RS1, RS4 and RS2 in the axial direction, such that along its axial course the drive input shaft AN passes centrally through the third shaft 3, the seventh shaft 7 and part of the fifth shaft 5. This is particularly advantageous, on the one hand for the dimensioning of the drive input shaft AN and the gearsets, but on the other hand also because it entails a comparatively simple lubricant supply to the planetary gears of the four planetary gearsets RS1 to RS4 and also entails a comparatively simple supply of pressure and lubricant to the three clutches E, D, C.

As can also be seen from FIG. 1, along its axial course the shaft 6 of the transmission, which indeed forms the active connection between the carrier ST1 of the first planetary gearset RS1 and the ring gear HO3 of the third planetary gearset RS3, encloses the fourth and second planetary gearsets RS4, RS2 and the two clutches E, D completely, and so forms the cylindrical space within which the disk set of the clutch F and the servomechanism of the clutch F for actuating the disk set are accommodated. As already mentioned, this clutch F is not present in the type-defining WO 2006/074707 A1. In the example embodiment shown in FIG. 1 the disk set of the clutch F, viewed spatially, is arranged in an area axially between the fourth planetary gearset RS4 and the second planetary gearset RS2, on a diameter radially above the planetary gearsets RS4, RS2. In accordance with the kinematic connection of the clutch F to the sixth shaft 6 and the eighth shaft 8 of the transmission, and with the spatial position of the shaft 8 centrally inside the shaft 6, in this case a section of the shaft 6 forms the outer disk carrier and a section of the shaft 8 the inner disk carrier of the clutch F. From this it can also be seen that a person with knowledge of the field has some freedom in the positioning of the disk set of the clutch F as viewed in the axial direction. Thus, in a design differing from FIG. 1 it could for example be provided that the disk set of the clutch F is arranged in an area radially over the fourth planetary gearset RS4 or in an area radially over the second planetary gearset RS2 and the third planetary gearset RS3—radially over the clutch assembly C/D/E and/or close to the planetary gearset RS3. The servomechanism associated with the disk set of the clutch F can be arranged both on the side of the disk set of the clutch F that faces toward the first planetary gearset RS1 and also on the side of the disk set of the clutch F that faces toward the third planetary gearset RS3. Examples of this will be explained in more detail later with reference to the other figures.

FIG. 2 shows an example of a shifting scheme for the 10-gear automatic transmission according to the invention in FIG. 1. In each gear three shifting elements are engaged and three are disengaged. Besides the shifting logic, example values for the respective transmission ratios i of the individual gear steps and the gear intervals ϕ to be determined therefrom can also be obtained from the shifting scheme. The transmission ratios i indicated are obtained from the (typical) fixed transmission ratios of the four planetary gearsets RS1, RS2, RS3, RS4 of minus 2.0, minus 1.60, minus 3.70 and minus 2.00. Furthermore, it can be seen from the shifting scheme that in sequential shift operations double shifts or group shifts are avoided, since two gear steps adjacent in the shift logic always use two shifting elements common to both. The seventh forward gear is made as a direct gear.

The first forward gear is obtained by engaging the brakes A and B and the clutch C, the second forward gear by engaging the brakes A and B and the clutch E, the third forward gear by engaging the brake B and the clutches C and E, the fourth forward gear by engaging the brake B and the clutches D and E, the fifth forward gear by engaging the brake B and the clutches C and D, the sixth forward gear by engaging the brake B and the clutches C and F, the seventh forward gear by engaging the clutches C, E and F, the eighth forward gear by engaging the brake A and the clutches C and F, the ninth forward gear by engaging the brake A and the clutches C and D, and the tenth forward gear by engaging the brake A and the clutches D and E. As can also be seen from the shifting scheme, a first reverse gear is obtained by engaging the brakes A and B and the clutch D. A second reverse gear is obtained by engaging the brakes A and B and the clutch F.

According to the invention the motor vehicle can be started by means of a shifting element integrated in the transmission. For this a particularly suitable shifting element is one which is needed both in the first forward gear and in the reverse gear, i.e. in this case preferably the brake A or the brake B. Advantageously, these two brakes are also needed in the second forward gear. If the brake B is used as the starting element integrated in the transmission, then starting is even possible in any of the first five gears and in the two reverse gears. As can be seen from the shifting scheme, as effective transmission-internal starting elements the clutch C is also suitable for starting in the forward direction and the clutch D for starting in the reverse direction.

A hill-holder function in the transmission, in which the drive output shaft AB of the transmission is held fixed relative to the transmission housing GG, is obtained by simultaneously engaging the brakes A and B and the clutches D and F. Starting in the first forward gear from a previously activated hill-holder function can be carried out by means of a simple overlap shift in which the clutch C is engaged while at the same time the clutches D and F are disengaged. Starting in the second forward gear from a previously activated hill-holder function can also be carried out by a simple overlap shift in which the clutch E is engaged and the clutches D and F are simultaneously disengaged. It is particularly simple to start in the first reverse gear from a previously activated hill-holder function, since to do this all that is necessary is to disengaged the clutch F. Likewise, it is simple to start in the second reverse gear from a previously activated hill-holder function, since for this it is only necessary to disengaged the clutch D.

In principle the spatial arrangement of the shifting elements within the transmission in the example embodiment of a 10-gear automatic transmission according to the invention shown in FIG. 1, can be as desired and is limited essentially only by the dimensions and external shape of the transmission housing GG. Correspondingly, FIGS. 3 to 11 show various examples of appropriate component configuration variants for the 10-gear automatic transmission according to FIG. 1, in each case with kinematic coupling of the gearset elements, shifting elements and shafts unchanged compared with FIG. 1. Furthermore, in the component configuration variants shown in FIGS. 3 to 11, the four planetary gearsets RS1 to RS4, viewed in the axial direction, are arranged coaxially one behind another in the sequence "RS1, RS4, RS2, RS3" as in FIG. 1.

Figure 3:
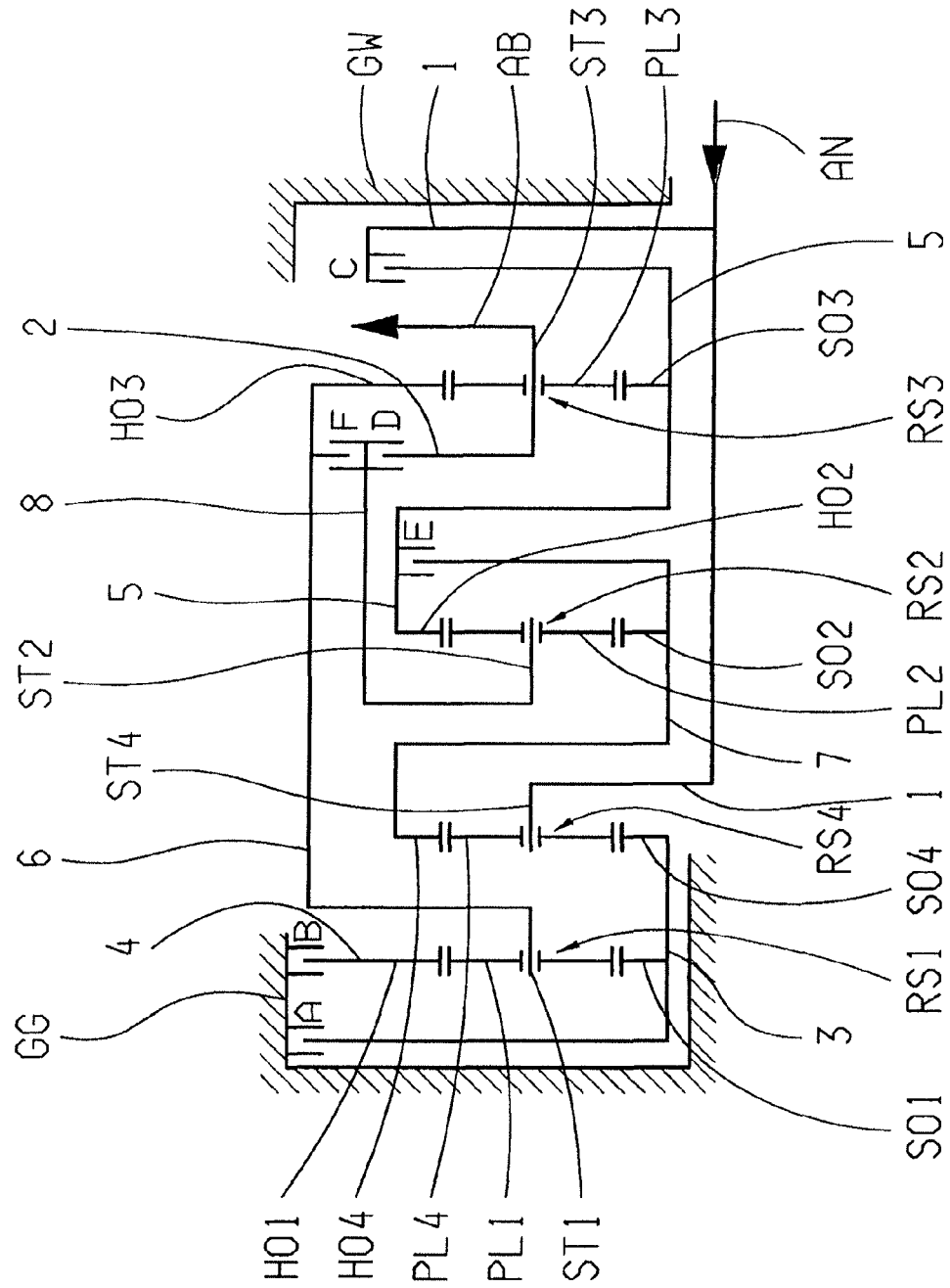
FIG. 3. Illustration showing a first component configuration variant for the transmission of FIG. 1, represented schematically

FIG. 3 now shows a first example component configuration variant for the transmission in FIG. 1, again represented in simplified schematic form. Different than FIG. 1 the drive input AN and drive output AB shafts are this time not arranged coaxially, so that this first component configuration variant is particularly suitable for a vehicle with so-termed front transverse drive, with the transmission output arranged axis-parallel to the transmission input. A further difference from FIG. 1 is that the drive input of the transmission is this time, for example, arranged on the side of the transmission opposite to the first planetary gearset RS1. This is possible because the drive input shaft AN or the first shaft 1 of the transmission can pass centrally through the transmission over its full axial length. Different than FIG. 1, in the transmission according to FIG. 3 the third shifting element C is not arranged on the side of the third planetary gearset RS3 facing toward the second planetary gearset RS2, but this time on the side of the third planetary gearset RS3 facing away from the second planetary gearset RS2. In this case the drive output shaft AB runs—for example in the manner of a spur drive—at least in part axially between the planetary gearset RS3 and the clutch C. For the arrangement of the clutch C this configuration makes available a larger diameter in the area between the drive output spur gear connected to the carrier ST3 and outer wall GW of the housing—here for example on the drive input side. Another difference between the transmissions according to FIGS. 1 and 3 is that in FIG. 3 the clutch F—or at least its disk set—as viewed spatially is arranged radially over the clutch D and axially next to the third planetary gearset RS3, whereby a common disk carrier can be used for the two clutches D and E, which then forms the inner disk carrier for the clutch F and the outer disk carrier for the clutch D.

With reference to FIGS. 4 to 11 further example embodiments of a 10-gear automatic transmission according to the invention are described below, these being based on the transmission shown in FIG. 1 with its coaxial drive input and output, with the particular intention of indicating various appropriate possibilities for the spatial arrangement of the disk sets of the six frictional shifting elements and the servomechanisms associated with the disk sets. In addition to the indexes already mentioned, in all of FIGS. 4 to 11 the following supplementary nomenclature is used: the outer disk carriers of the six shifting elements A to F are denoted $A\_a$ to $F\_a$, the inner disk carriers of the six shifting elements A to F are denoted $A\_i$ to $F\_i$, the disk sets of the six shifting elements A to F are denoted $A\_l$ to $F\_l$ and the servomechanisms for actuating these disk sets $A\_l$ to $F\_l$ are denoted $A\_s$ to $F\_s$. A servomechanism of this type usually comprises at least one hydraulically or pneumatically actuated piston that acts upon its associated disk set, a pressure space that acts upon the piston and can be filled with pressure medium for the purpose of engaging the disk set, and a piston restoring element such as a spring or a restoring pressure chamber for the purpose of disengaging the disk set. If the shifting element is a clutch, then the servomechanism associated with the clutch usually also comprises a means for compensating the rotary pressure of the pressure space filled with pressure medium, usually comprising a pressure compensation space that can be filled with lubricant not under pressure and which acts upon the piston in opposition to its engaging direction. In other respects, for those with knowledge of the field the representations shown in FIGS. 4 to 11 are self-explanatory.

Figure 4:
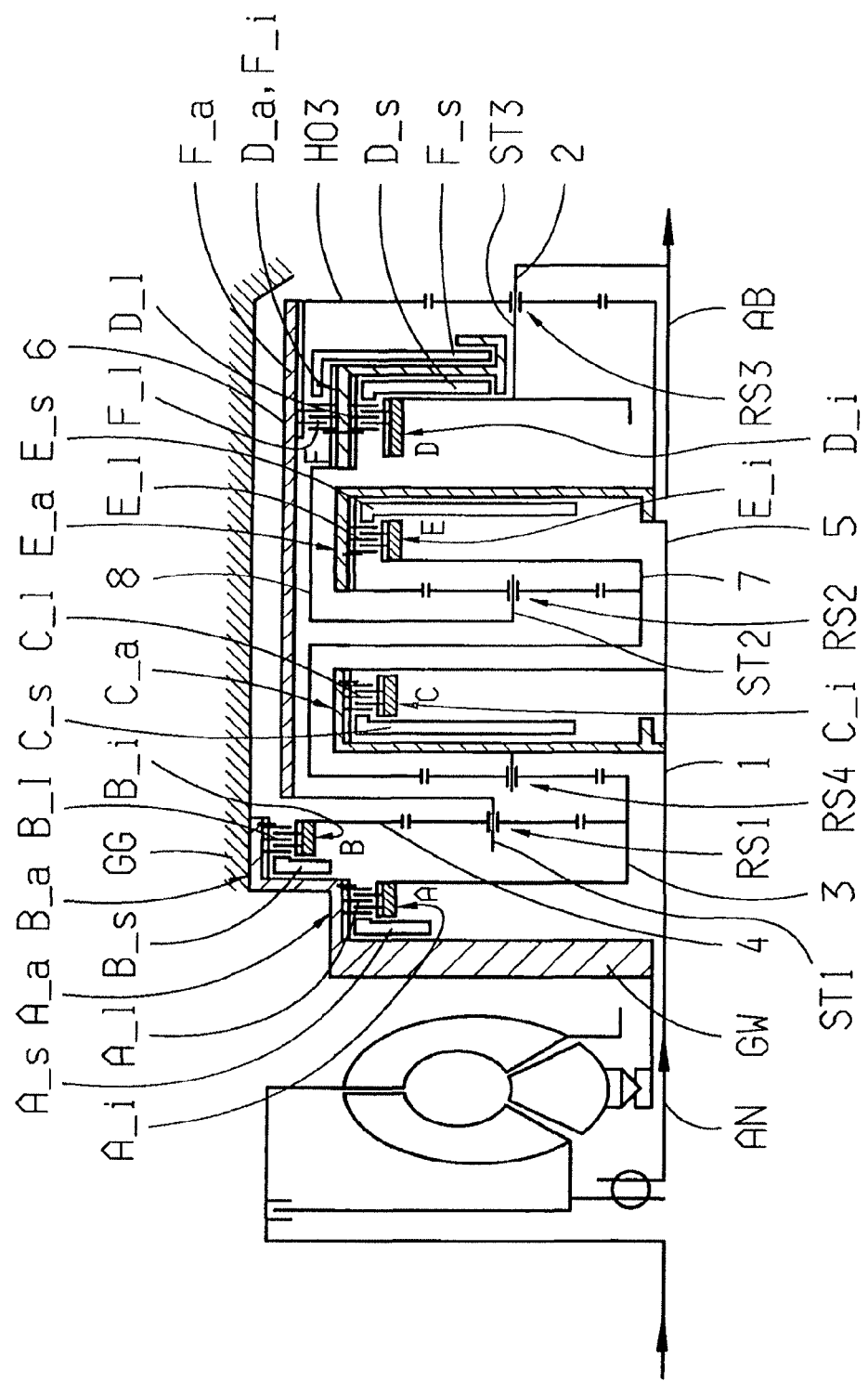
FIG. 4: Illustration showing a second component configuration variant for the transmission of FIG. 1

FIG. 4, then, shows an example second component configuration variant for the transmission of FIG. 1. In contrast to FIG. 1 the third shifting element C, viewed spatially, is now arranged axially completely between the fourth and second planetary gearsets RS4, RS2. The fourth, fifth and second shifting elements D, E, F, viewed spatially, are arranged axially completely between the second and third planetary gearsets RS2, RS3, the fifth shifting element E being axially directly adjacent to the second planetary gearset RS2 and the fourth and sixth shifting elements D, F forming an assembly which is axially directly adjacent to the third planetary gearset RS3. Thus, the assembly comprises a common disk carrier which forms a section of the shaft 8 and is connected to the carrier ST2 of the second planetary gearset RS2. This common disk carrier is the outer disk carrier D_a for the clutch D and the inner disk carrier F_i for the clutch F, Furthermore, the assembly of shifting elements D, F contains the disk set D_l of the clutch D arranged inside the cylindrical space of the common disk carrier D_a/F_i, the disk set F_l of the clutch F arranged radially over the disk set D_a/F_i, the disk set F_l of the clutch F arranged radially over the disk set D_l, the servomechanism D_s for actuating the disk set D_l of the clutch D, and the servomechanism F_s for actuating the disk set F_l of the clutch F. A special design feature in this case is that the servomechanism D_s is arranged inside the cylindrical space of the common disk carrier D_a/F_i, the servomechanism F_s partially coaxially encloses the common disk carrier D_a/F_i, and both servomechanisms Ds, F_s are mounted so that they can move axially on the common disk carrier D_a/F_i, being arranged axially substantially next to one another and separated from one another only by a wall of the inner disk carrier D_i. Thus, the two servomechanisms D_s, F_s act in each case on the side of the associated disk set D_l or F_l that faces toward the third planetary gearset RS3 and, to engage the respective clutch D or F, they actuate the associated disk set D_l or F_l axially in the direction opposite to the third planetary gearset RS3, i.e. axially in the direction of the second planetary gearset RS2. Both servomechanisms D_s, F_s always rotate at the speed of the shaft 8, i.e. always at the same speed as the carrier ST2 of the second planetary gearset RS2 and the drive output shaft AB.

The inner disk carrier D_i of the clutch D forms a section of the shaft 2 and in accordance with the transmission layout is connected via the carrier ST3 of the third planetary gearset RS3, in this case close to the drive output, to the drive output shaft AB. The section of the shaft 6 close to the ring gear HO3 of the third planetary gearset RS3 forms the outer disk carrier F_a of the sixth shifting element F, and in accordance with the transmission layout the outer disk carrier F_a is connected on its side facing away from the third planetary gearset RS3 to the carrier ST1 of the first planetary gearset RS1 which in this case is close to the drive input.

A further difference between the transmissions according to FIG. 1 and FIG. 4 is that in FIG. 4 the first shifting element A, made as a brake, is arranged on a smaller diameter than the second shifting element B also made as a brake, whereby in the area radially over the disk set A_l of the brake A and on the side close to the drive input axially adjacent to the disk set B_l of the brake B some structural space is provided within the inside space of the transmission, which is particularly well suited for accommodating a hydraulic pump of the transmission positioned axis-parallel to the drive input shaft AN (not shown in FIG. 4 for the sake of simplicity).

Figure 5:
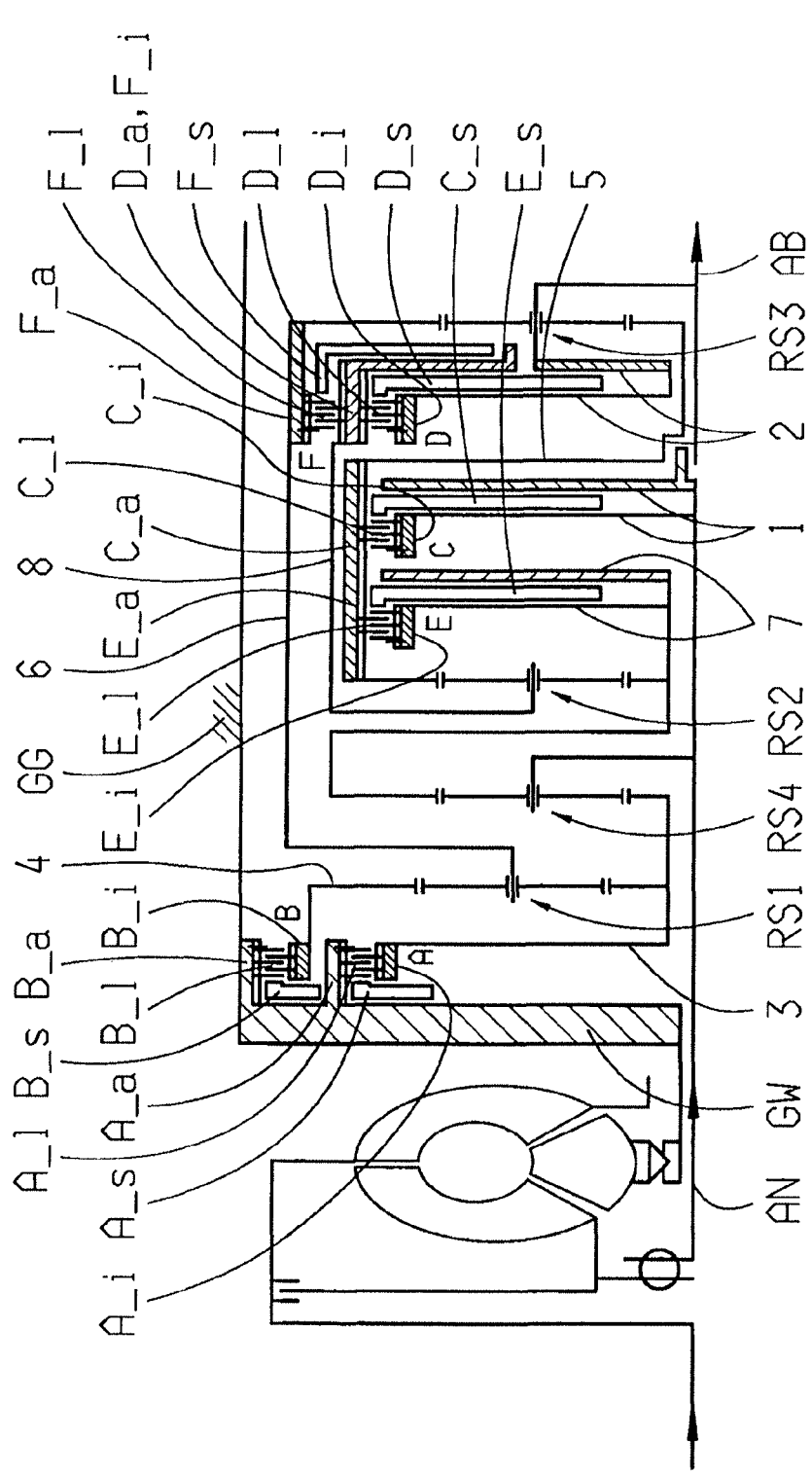
FIG. 5: Illustration showing a third component configuration variant for the transmission of FIG. 1

FIG. 5 shows an example third component configuration variant for the transmission according to FIG. 1. Different than FIG. 1, in FIG. 5 it is now provided that, viewed spatially, the brake A is arranged largely radially under the brake B, the clutches E, C and D are arranged in that order axially next to one another with disk sets E_l, C_l, and D_l of the same or at least approximately the same diameter, and the clutch F directly adjacent to the third planetary gearset RS3 on its side facing toward the second planetary gearset RS2. For the two clutches E and C a common disk carrier is provided, which forms the outer disk carriers E_a, C_a both for the clutch E and for the clutch C. In this case the designs of the two clutches E and C are similar.

The design of the two clutches D and F as an assembly is derived from FIG. 4. Different than that in figure, in FIG. 5 it is provided that only the servomechanism F_s of the radially outer clutch F is mounted to move axially on the disk carrier D_a/F_i common to the two clutches D and F, and always rotates at the same speed as the shaft 8, while in contrast the servomechanism D_s of the radially inner clutch D is mounted to move axially on the inner disk carrier D_i of the clutch D and always rotates at the same speed as the shaft 2. In accordance with this design the assembly D/F of the two clutches D, F should also be regarded as the inner disk carrier D_i.

Figure 6:
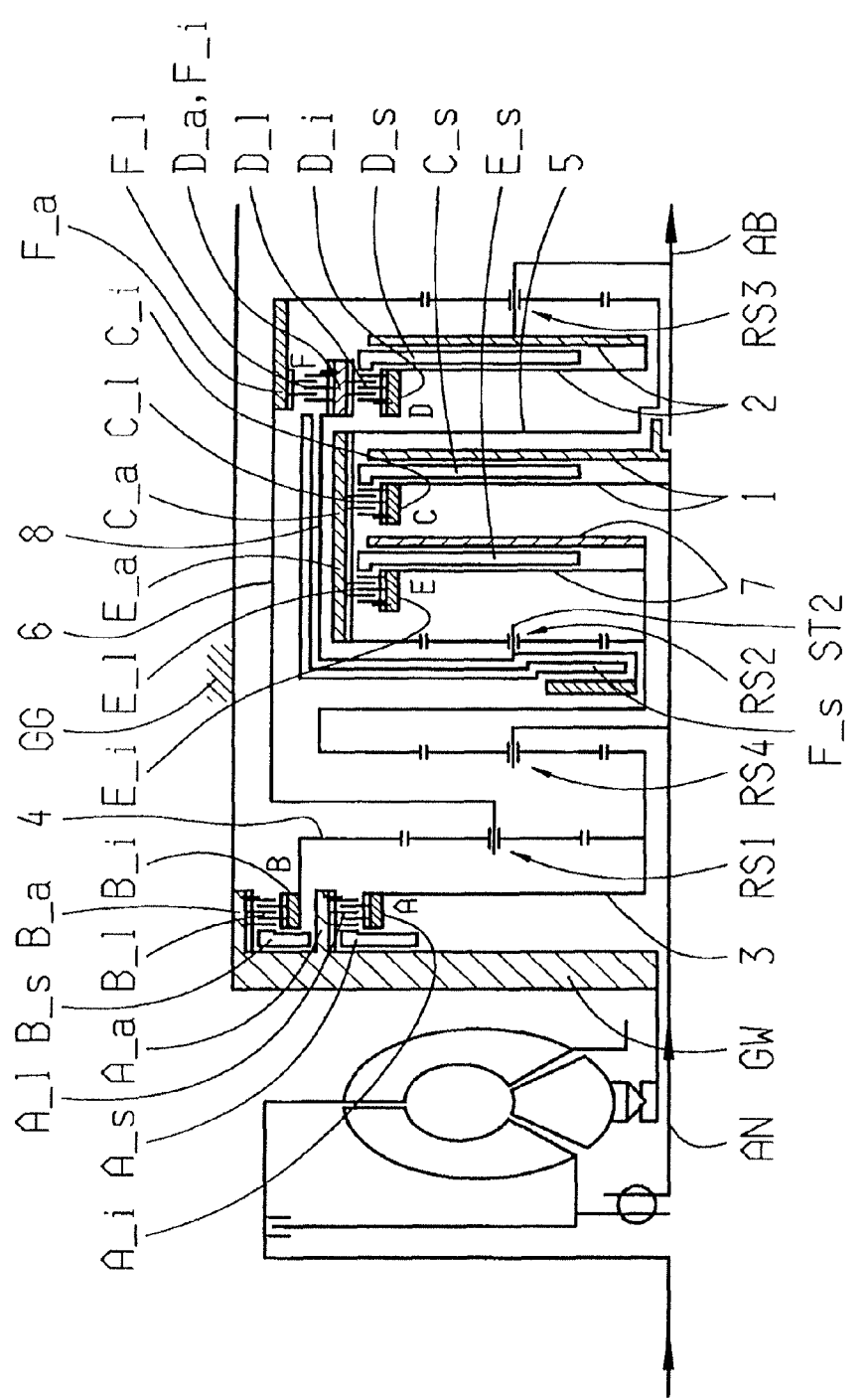
FIG. 6: Illustration showing a fourth component configuration variant for the transmission of FIG. 1

FIG. 6 shows an example fourth component configuration variant of the transmission of FIG. 1, based on the third component configuration variant shown in FIG. 5. The third and fourth component configuration variants differ only as regards the design and spatial arrangement of the servomechanism F_s of the clutch F. In contrast to FIG. 5, this time the servomechanism F_s according to FIG. 6 always rotates at the speed of the eighth shaft 8 of the transmission, i.e. always at the same speed as the inner disk carrier F_i of the clutch F. For this it is provided that the servomechanism F_s, viewed spatially, is arranged largely in an area axially between the fourth and second planetary gearsets RS4, RS2, such that at least the pressure space of this servomechanism F_s is positioned close to the carrier ST2 of the second planetary gearset RS2, the piston of the servomechanism F_s is mounted to move axially on this carrier ST2 or on the inner disk carrier F_i of the clutch F, and an actuating finger of this piston that acts upon the disk set F_l of the clutch F spans radially across the planetary gearset RS2 and the clutches E and C in the axial direction. When the clutch F is being engaged the piston or the actuating finger of the servomechanism F_s actuates the disk set F_1 axially in the direction of the third planetary gearset RS3.

Figure 7:
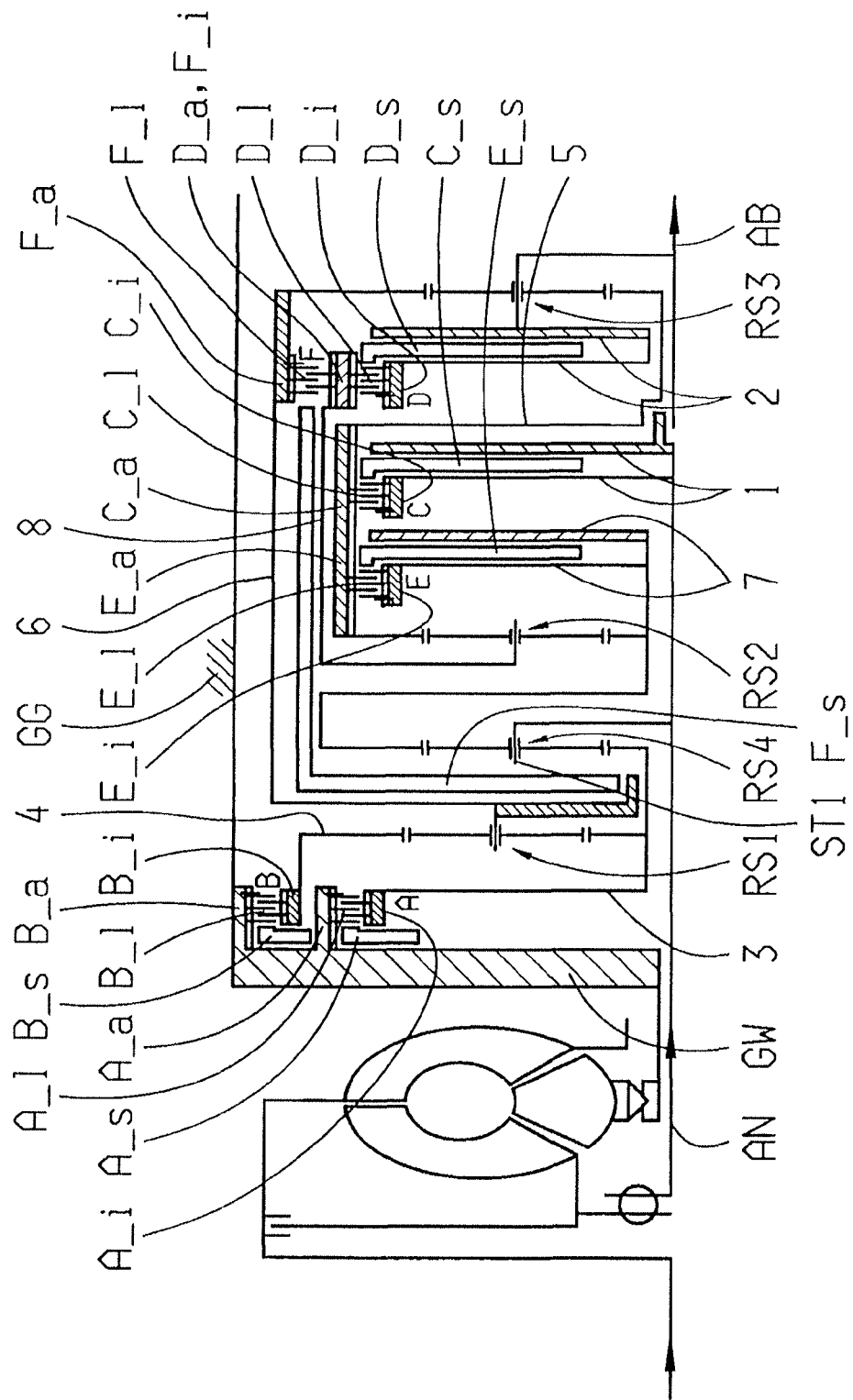
FIG. 7: Illustration showing a fifth component configuration variant for the transmission of FIG. 1

FIG. 7 shows an example fifth component configuration variant for the transmission according to FIG. 1, again based on the third component configuration variant shown in FIG. 5. The third and fifth component configuration variants differ only as regards the design and spatial arrangement of the servomechanism F_s of the clutch F. In contrast to FIG. 5, the servomechanism F_s in FIG. 7 this time always rotates at the speed of the sixth shaft 6 of the transmission, i.e. always at the same speed as the outer disk carrier F_a of the clutch F. For this it is provided that the servomechanism F_s, viewed spatially, is arranged largely in an area axially between the first and fourth planetary gearsets RS1, RS4, such that at least the pressure space of this servomechanism F_s is positioned close to the carrier ST1 of the first planetary gearset RS1, the piston of the servomechanism F_s is mounted to move axially on this carrier ST1 or on the outer disk carrier F_a of the clutch F, and an actuating finger of this piston which acts upon the disk set F_l of the clutch F spans radially across the planetary gearsets RS4 and RS2 and the clutches E and C in the axial direction. When the clutch F is being engaged, the piston or the actuating finger of the servomechanism F_s actuates the disk set F_l axially in the direction of the third planetary gearset RS3.

Figure 8:
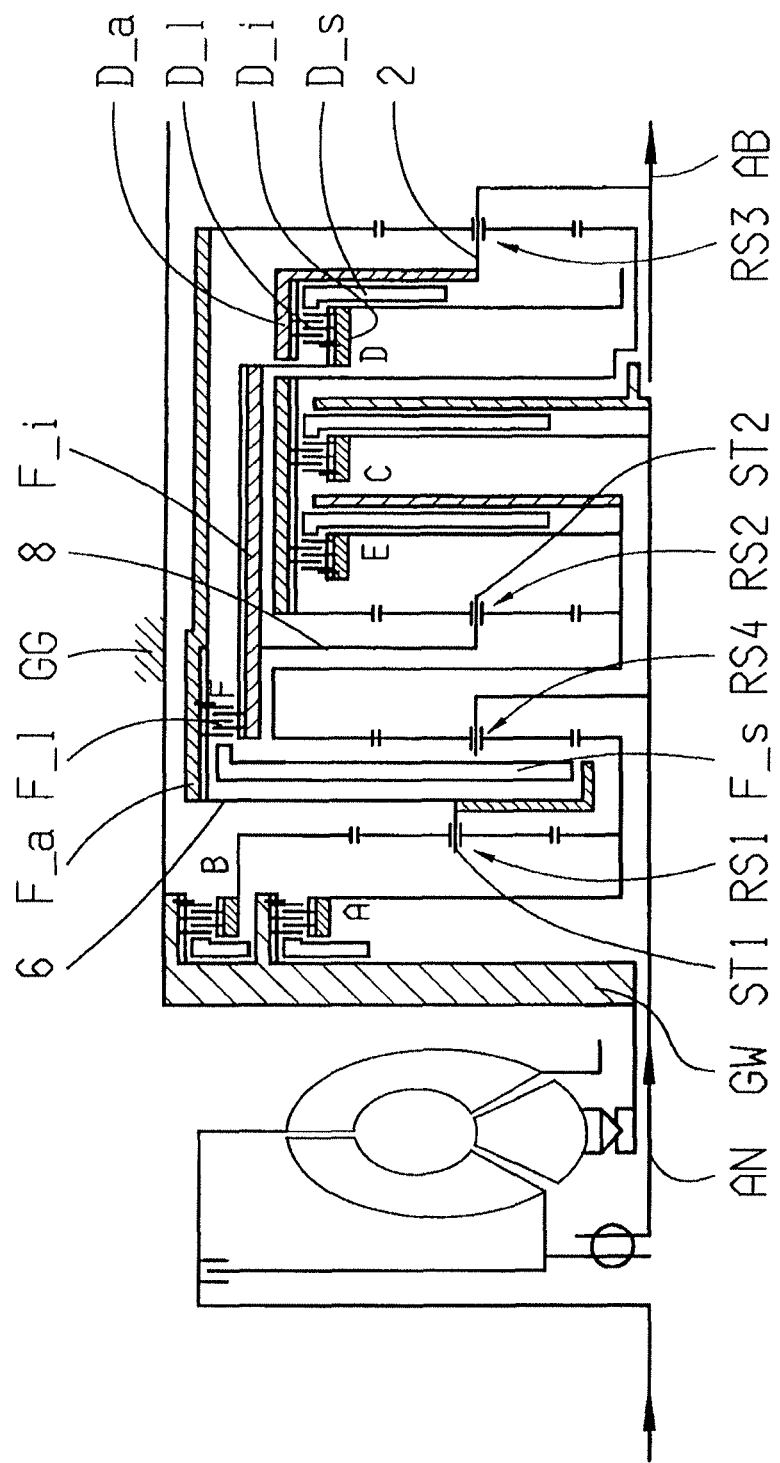
FIG. 8: Illustration showing a sixth component configuration variant for the transmission of FIG. 1

FIG. 8 shows an example sixth component configuration variant of the transmission according to FIG. 1, which is based on the fifth component configuration variant shown in FIG. 7. This sixth component configuration variant differs from the fifth component configuration variant particularly in that according to FIG. 8 the disk set F_l of the clutch F, viewed spatially, is this time positioned in an area radially over the planetary gearsets RS2 and RS4 arranged axially directly next to one another and thus at least partially radially over the fourth planetary gearset RS4. For this, a section of the eighth shaft 8 of the transmission which starts from the carrier ST2 of the second planetary gearset RS2 and is formed as the inner disk carrier F_i for the clutch F extends axially in the direction of the first planetary gearset RS1, which is positioned on the side of the fourth planetary gearset RS4 facing away from the second planetary gearset RS2 (and toward the drive input). Correspondingly, an axial section of the sixth shaft 6 of the transmission arranged in the area radially over the planetary gearset RS4 is made as the outer disk carrier F_a for the clutch F. The servomechanism F_s of the clutch F is positioned essentially axially between the planetary gearsets RS1 and RS4, always rotates at the speed of the carrier ST1 of the first planetary gearset RS1, and when the clutch F is being engaged, actuates the disk set F_l associated with it axially in the direction of the second and third planetary gearsets RS2, RS3.

A further difference between the transmissions in FIG. 7 and FIG. 8 is that in FIG. 8 the inner disk carrier D_i of the clutch D is connected to the eighth shaft 8 of the transmission. Correspondingly, in FIG. 8 the outer disk carrier D_a of the clutch D is connected to the second shaft 2 or drive output shaft AB. This outer disk carrier D_a, formed as a cylinder, besides the disk set D_l of the clutch D, also holds the servomechanism D_s of the clutch D provided for actuating the disk set D_l, which can move axially. This makes for a comparatively more simple design of the clutch D.

Figure 9:
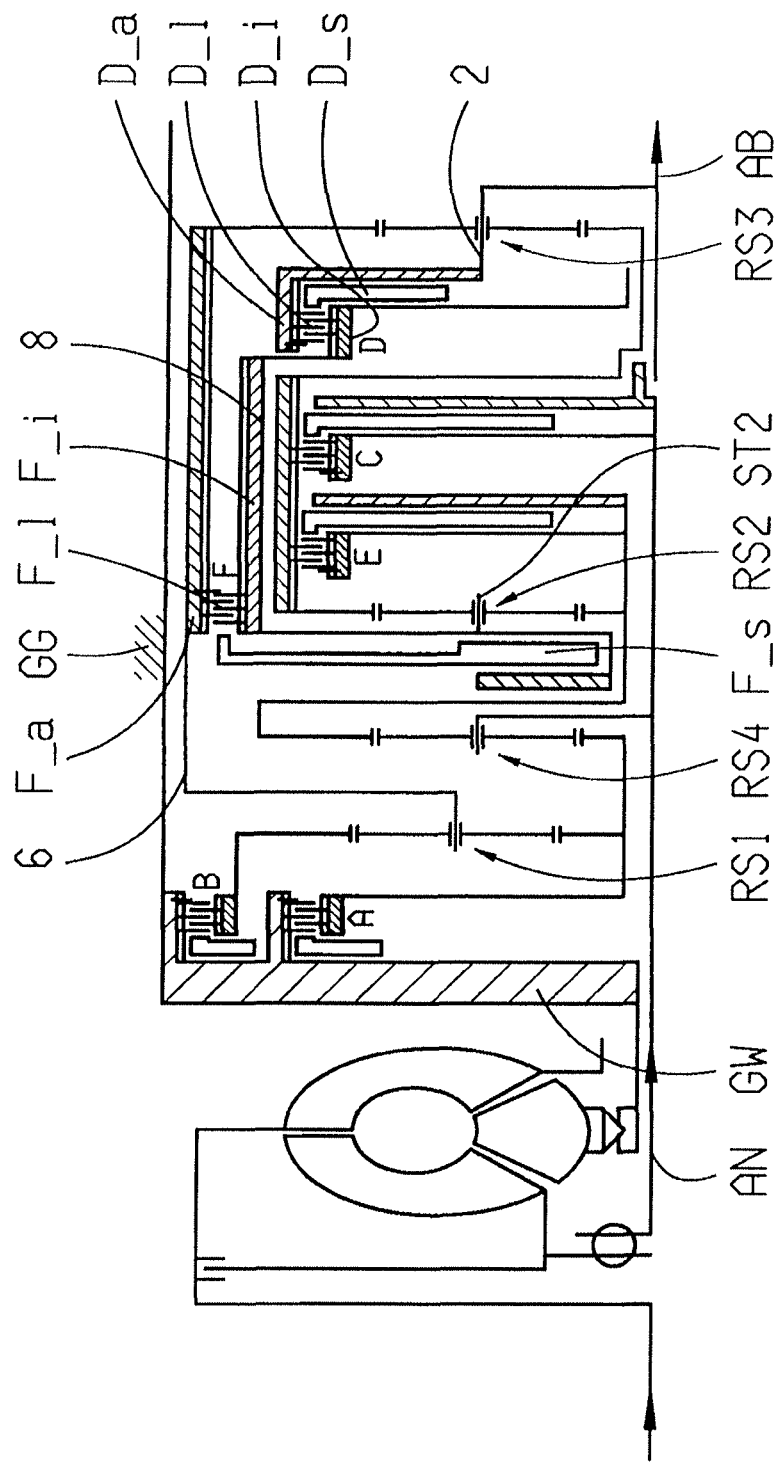
FIG. 9: Illustration showing a seventh component configuration variant for the transmission of FIG. 1

FIG. 9 shows an example seventh component configuration variant of the transmission according to FIG. 1, based on the sixth component configuration variant shown in FIG. 8. Different than the sixth component configuration variant, in this seventh component configuration variant it is provided that the disk set F_l of the clutch F, viewed spatially, is arranged in an area medially over the second planetary gearset RS2 and the servomechanism F_s of the clutch F provided for actuating the disk set F_l, as viewed spatially, is arranged largely axially between the fourth planetary gearset RS4 and the second planetary gearset RS2. Thus the servomechanism F_s always rotates at the speed of the eighth shaft 8 of the transmission, i.e. at the same speed as the carrier ST2 of the second planetary gearset RS2 and the same speed as the inner disk carrier F_i of the clutch F. The servomechanism F_s is mounted and able to move axially on the carrier ST2 or on the inner disk carrier F_i, and when the clutch F is being engaged it actuates its associated disk set F_l axially in the direction of the third planetary gearset RS3.

Figure 10:
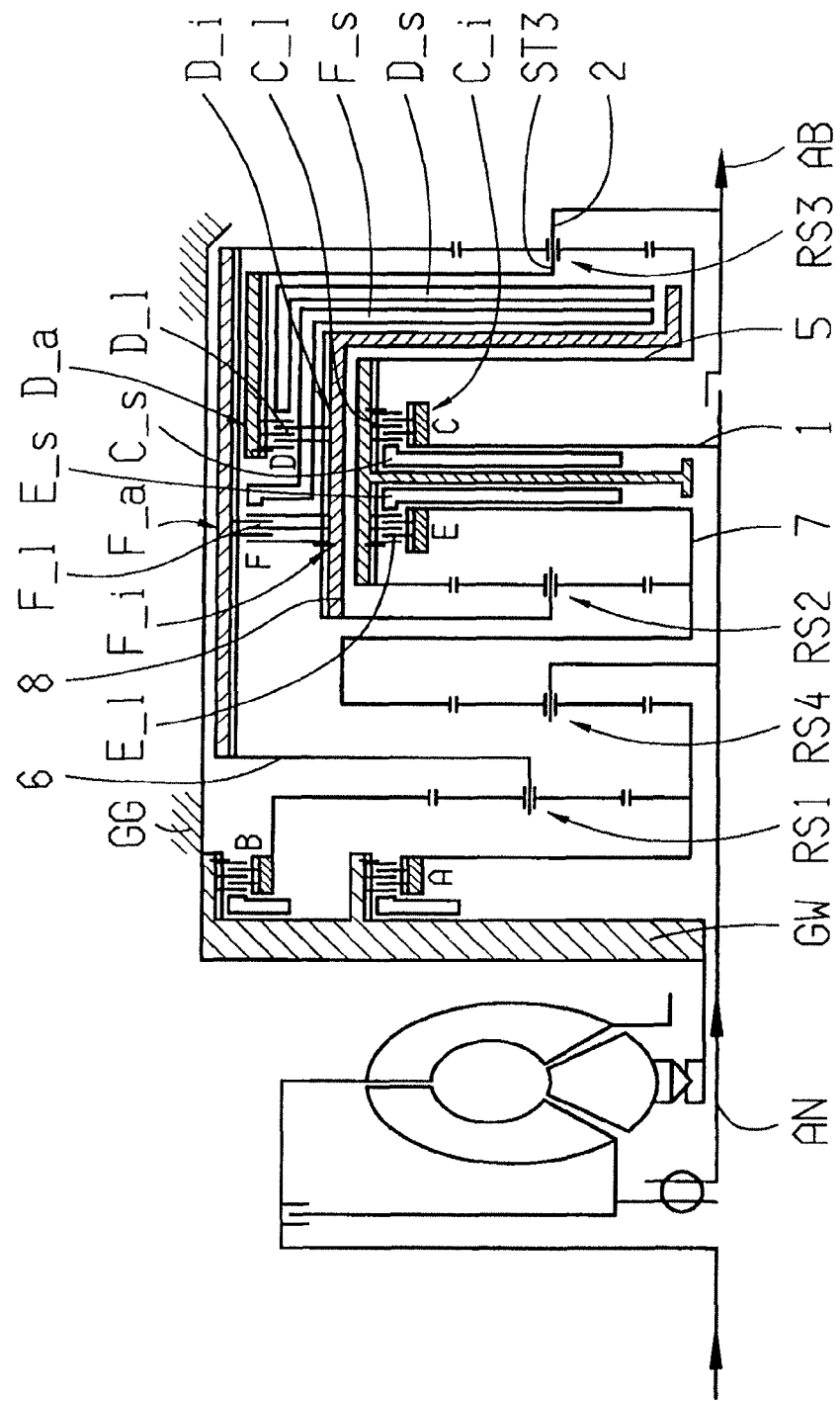
FIG. 10: Illustration showing an eighth component configuration variant for the transmission of FIG. 1

FIG. 10 shows an example eighth component configuration variant for the transmission of FIG. 1. The essential characteristic of this eighth component configuration variant is that all four of the clutches C to F, viewed spatially, are arranged at least nearly completely in the area axially between the two planetary gearsets RS2 and RS3, with the following design features:

the clutches C and E are arranged axially next to one another and form a structural assembly;

the disk sets D_l and F_l of the clutches D and F are arranged axially next to one another and radially over the disk sets C_l and E_l of the clutches C and E;

the disk sets E_l and F_l are arranged close to the planetary gearset RS2;

the disk set F_l is arranged essentially radially over the disk set C_l;

a common disk carrier is provided for the clutches C and E, which forms a section of the shaft 5 of the transmission, formed as the outer disk carrier for the two clutches C, E and their disk sets C_l, E_l, and which accommodates in an axially movable manner the servomechanisms C_s, E_s of the two clutches C, E provided for actuating the disk sets C_l, E_l so that the two servomechanisms C_s, E_s always rotate at the speed of the shaft 5;

the two servomechanisms C_s, E_s are arranged axially directly next to one another and thus at least partially axially between the two disk sets C_l, E_l, and are separated from one another only by an outer surface of the common outer disk carrier C_a, E_a of the clutches C, E, so that when the clutch C is being engaged the servomechanism C_s actuates its associated disk set C_l axially in the direction of the third planetary gearset RS3, and so that when the clutch E is being engaged the servomechanism E_s actuates its associated disk set E_l axially in the direction of the second planetary gearset RS2;

a common disk carrier is provided for the clutches D and F, which forms a section of the shaft 8 of the transmission, is formed as the inner disk carrier D_i, F_i for the two clutches D, F and their disk sets D_, F_l, and accommodates axially movably the servomechanisms D_s, F_s of the two clutches D, F provided for actuating the disk sets D_, F_l so that the two servomechanisms D_s, F_s always rotate at the speed of the shaft 8;

when the clutch D is being engaged, the servomechanism D_s actuates the disk set D_l associated with it axially in the direction of the second planetary gearset RS2;

when the clutch F is being engaged, the servomechanism F_s of the clutch F also actuates the disk set F_l associated with it axially in the direction of the second planetary gearset RS2, and a section or actuating finger of the piston of the servomechanism F_s of the clutch F that can be acted on by pressure, which acts upon the disk set F_l, passes through the inner disks of the disk set D_l of the clutch D mounted on the common inner disk carrier D_i/F_i for the clutches D and F in the axial direction;

a cylindrical outer disk carrier D_a is provided for the clutch D, which forms a section of the shaft 2 of the transmission and is connected by the carrier ST3 of the third planetary gearset RS3 to the drive output shaft AB;

a cylindrical outer disk carrier F_a is provided for the clutch F, which forms an axial section of the shaft 6, which holds the outer disks of the disk set F_l of the clutch F, and which, along its axial length, coaxially encloses the fourth planetary gearset RS4 and the common inner disk carrier D_i/F_i for the clutches D and F and the outer disk carrier D_a of the clutch D.

Figure 11:
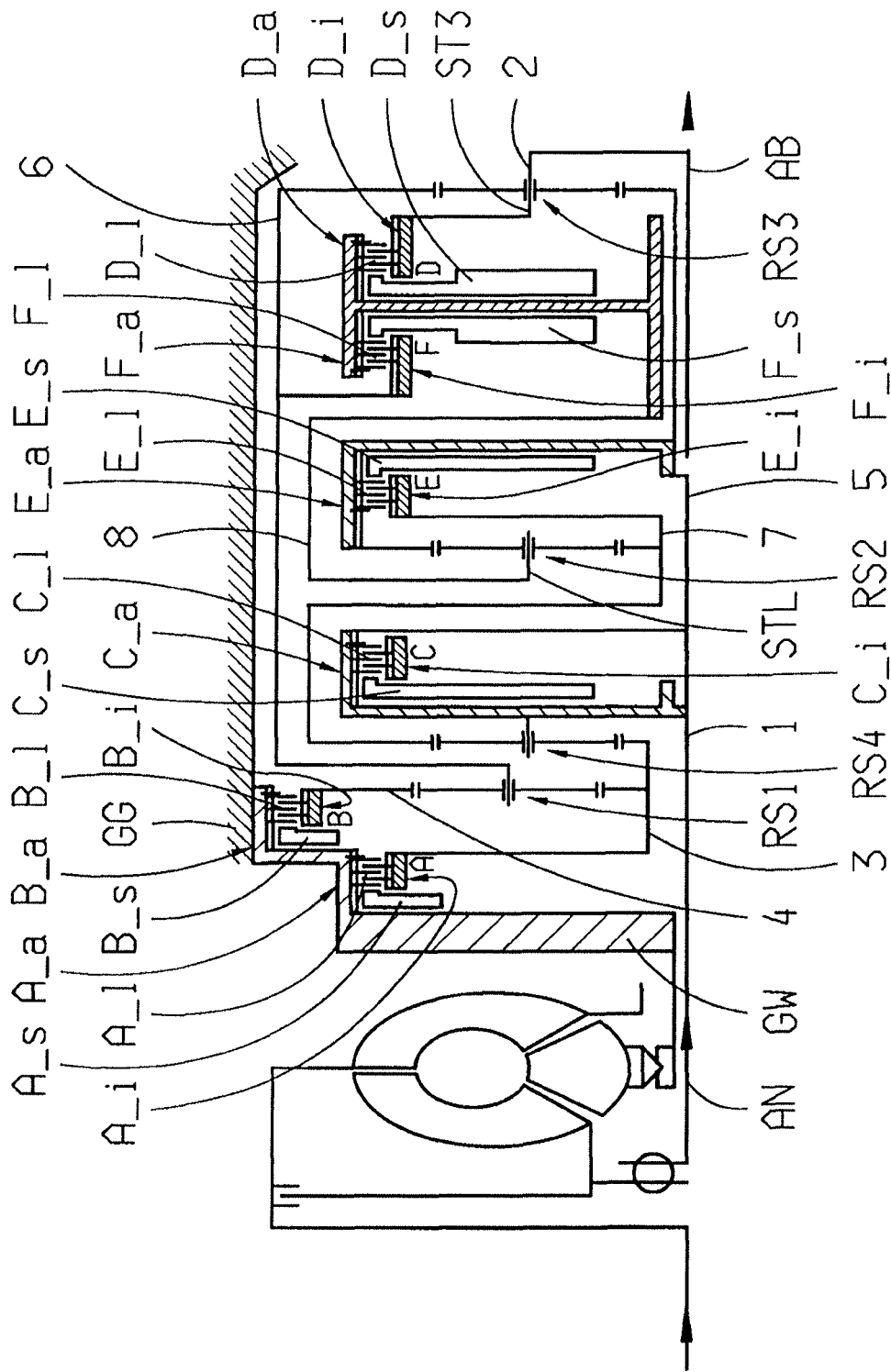
FIG. 11: Illustration showing a ninth component configuration variant for the transmission of FIG. 1

FIG. 11 shows an example ninth component configuration variant for the transmission according to FIG. 1, which is based on the second component configuration variant shown in FIG. 4. In contrast to the second component configuration variant, in this ninth component configuration variant it is provided that the two clutches D and F are now positioned axially next to one another, as an assembly with the following design features:

viewed spatially, the assembly is arranged between the clutch E and the third planetary gearset RS3;

a common disk carrier is provided for the clutches D and F, which forms a section of the shaft 8 of the transmission, is formed as the outer disk carrier D_a, F_a for the two clutches D, F and accommodates the disk sets D_l, F_l and, in an axially movable manner, the servomechanisms D_s, F_s provided for actuating the disk sets D_l, F_l, so that the two servomechanisms D_s, F_s always rotate at the speed of the shaft 8 or the carrier ST2 of the second planetary gearset RS2;

the two servomechanisms D_s, F_s are positioned axially directly next to one another and thus at least partially axially between the two disk sets D_l, F_l, and are separated from one another only by an outer surface of the common outer disk carrier D_a/F_a of the clutches D, F;

when the clutch D is being engaged, the servomechanism D_s actuates its associated disk set D_l axially in the direction of the third planetary gearset RS3;

when the clutch F is being engaged, the servomechanism F_s actuates its associated disk set F_l axially in the direction of the second planetary gearset RS2;

the inner disk carrier D_i of the clutch D is connected to the carrier ST3 of the third planetary gearset RS3; and the inner disk carrier F_i of the clutch F is connected, on the side of the assembly opposite to the third planetary gearset RS3, to the shaft 6 of the transmission, which forms a cylindrical space inside which are arranged the planetary gearset RS4, the clutch C, the planetary gearset RS2, the clutch E and the assembly with the two clutches D, F.

Figure 12:
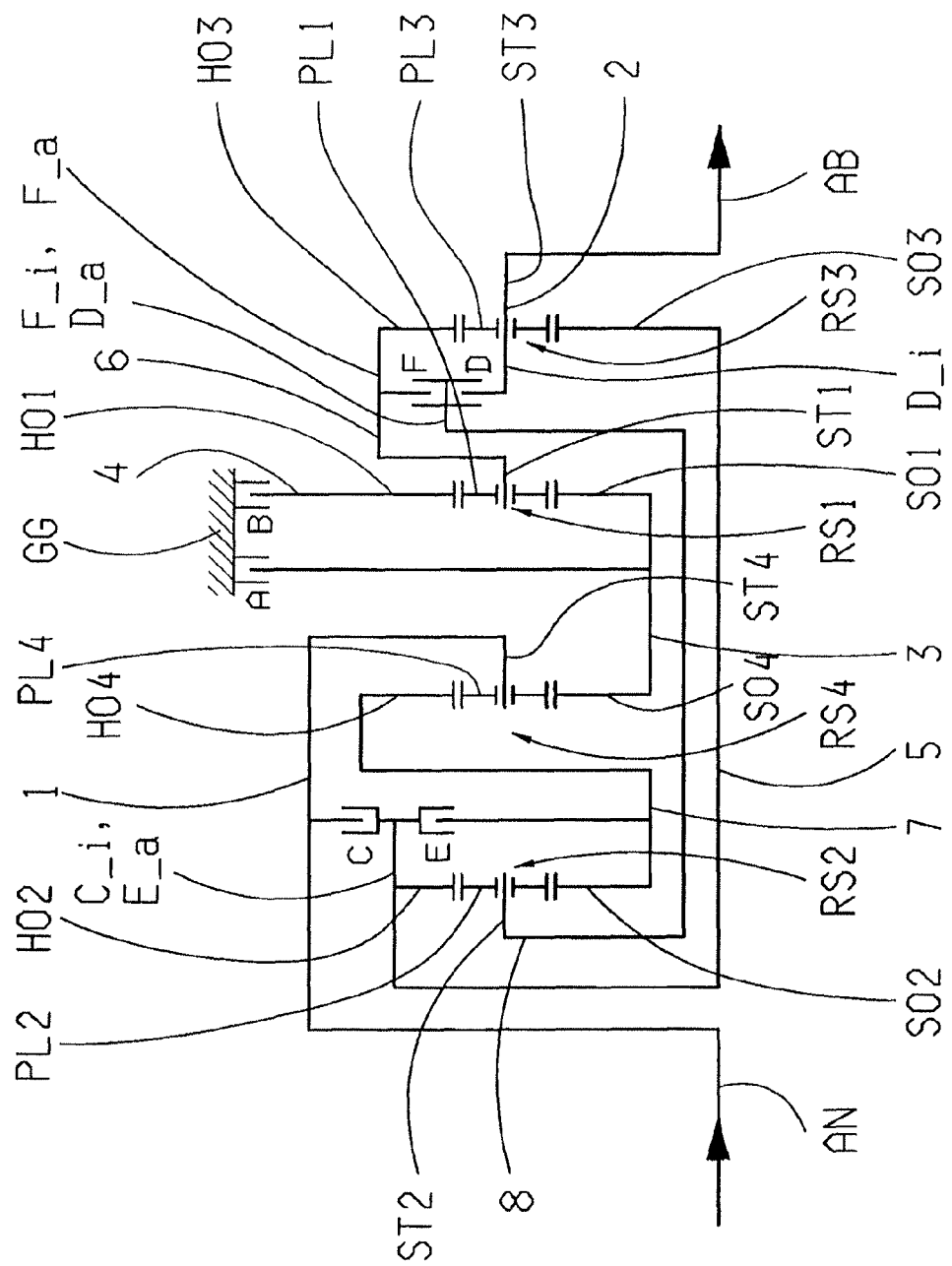
FIG. 12: Illustration showing a tenth component configuration variant for the transmission of FIG. 1, schematically represented

Finally, FIG. 12 shows an example tenth component configuration variant for the transmission of FIG. 1, in a simplified schematic representation. Starting from the consideration that the spatial arrangement of the four planetary gearsets RS1 to RS4 relative to one another within the transmission housing GG can also be varied within wide limits, a transmission according to the invention is described with reference to FIG. 12 in which the sequence of the four planetary gearsets RS1 to RS4 arranged coaxially in series one after another is different from that of FIG. 1, as an example showing how those with knowledge of the field can derive other effective component configuration variants from the transmission concept according to the invention. In this context a person knowledgeable in the field can if necessary also apply the previously mentioned suggestions regarding the design and arrangement of the individual components of the transmission in an appropriate manner to the transmission represented in simplified form in FIG. 12.

As can be seen in FIG. 12, compared with the transmission according to FIG. 1 the kinematic coupling of the individual elements of the four planetary gearsets RS1 to RS4 to one another, to the six shifting elements a to F and to the drive input shaft AN and the drive output shaft AB, is unchanged. In contrast to the transmission of FIG. 1, in the tenth component configuration variant proposed here it is provided that, as viewed in the axial direction, the four individual negative planetary gearsets RS1 to RS4 are arranged coaxially one after another in the defined sequence "RS2, RS4, RS1, RS3", with the drive input shaft AN and the drive output shaft AB arranged coaxially with one another and the second planetary gearset RS2 forming the gearset of the automatic transmission closest to the drive input, while the third planetary gearset RS3 forms the gearset of the automatic transmission closest to the drive output. In another design for a transmission in which the drive input and drive output shafts are not coaxial but axis-parallel or at an angle to one another, both the drive output and the drive input of the transmission can be arranged on the same side of the transmission housing close to the third planetary gearset RS3.

As can also be seen in FIG. 12, the two clutches C and E form an assembly with a disk carrier common to both clutches C, E for holding the disk sets and servomechanisms of them both. This common disk carrier forms a section of the fifth shaft 5 of the transmission and is connected on the one hand directly to the ring gear HO2 of the second planetary gearset RS2 and on the other hand, via a long intermediate shaft which passes centrally through the planetary gearsets RS2, RS4 and RS1, to the sun gear SO3 of the third planetary gearset RS3. In FIG. 12, as an example, this common disk carrier forms the inner disk carrier C_i for the clutch C and the outer disk carrier E_a for the clutch E, so the disk set of clutch C is positioned substantially radially over the disk set of clutch E in an area axially between the second planetary gearset RS2 and the fourth planetary gearset RS4. In this case, particularly for the supply of pressure and lubricant it is expedient to mount the servomechanisms of the two clutches C, E (not shown in FIG. 12 for the sake of simplicity) axially movably on the disk carrier C_i/E_a common to the two clutches C and E, so that the servomechanisms of the two clutches C, E always rotate at the speed of the fifth shaft 5 of the transmission. If necessary a person with knowledge of the field could also displace the disk set of the clutch C, for example to an area radially over the second planetary gearset RS2. Alternatively, such a person could if necessary also arrange the disk sets of the two clutches C, E axially next to one another.

As can also be seen in FIG. 12, the two brakes A and B form an assembly which, this time, is arranged in the central area of the transmission. The brakes A and B are arranged axially next to one another on approximately the same diameter radially above the planetary gearsets RS1 and RS4, with the brake B—in particular its disk set—in an area radially over the first planetary gearset RS1 and the brake A on the side of the brake B facing toward the fourth planetary gearset RS4.

As can also be seen in FIG. 12, the two clutches D and F form an assembly which, viewed spatially, is arranged in an area axially between the first planetary gearset RS1 and the third planetary gearset RS3. To obtain a structural form as compact as possible with the shortest possible length, the disk sets of the two clutches D, F are arranged one above the other. In the example embodiment shown in FIG. 12, for this a disk carrier common to both clutches D, F is provided to hold the disk sets and servomechanisms of the two clutches D, F. This common disk carrier forms a section of the eighth shaft 8 of the transmission and is correspondingly connected to the carrier ST2 of the second planetary gearset RS2 by a long intermediate shaft which passes centrally through the planetary gearsets RS1, RS4 and RS2 and thus partially radially encloses the shaft 5. In FIG. 12, as an example this common disk carrier forms the outer disk carrier D_a for the clutch D and the inner disk carrier F_i for the clutch F, so that the disk set of clutch F is arranged substantially radially over the disk set of clutch D. Correspondingly, the inner disk carrier D_i of the (radially inner) clutch D forms a section of the shaft 2 of the transmission and is rigidly connected to the carrier ST3 of the third planetary gearset RS3 and to the drive output shaft AB, whereas the outer disk carrier F_a of the (radially outer) clutch F forms a section of the shaft 6 of the transmission and is rigidly connected to the carrier ST1 of the first planetary gearset RS2 and to the ring gear HO 3 of the third planetary gearset RS4. Particularly for the supply of pressure and lubricant, it is expedient to mount the servomechanisms of the two clutches D, F (not shown in FIG. 12 for the sake of simplicity) axially movably on the disk carrier D_a/F_i common to the two clutches D, F, so the servomechanisms of the two clutches D, F always rotate at the speed of the shaft 8 of the transmission. If necessary, a person with knowledge of the field could also arrange the disk sets of the two clutches D, F axially next to one another.

Starting from the transmission layout according to FIG. 12, two further example embodiments of a 10-gear automatic transmission according to the invention will now be described with reference to the next figures, FIG. 13 and FIG. 14, both of which can be operated with the same shifting logic as shown in FIG. 2. Starting from the consideration that the fifth shifting element E of the transmission made as a clutch serves to fix the second planetary gearset RS2 of the transmission when necessary, FIGS. 13 and 14 show two further possibilities for coupling the fifth shifting element E kinematically to the second planetary gearset RS2.

Figure 13:
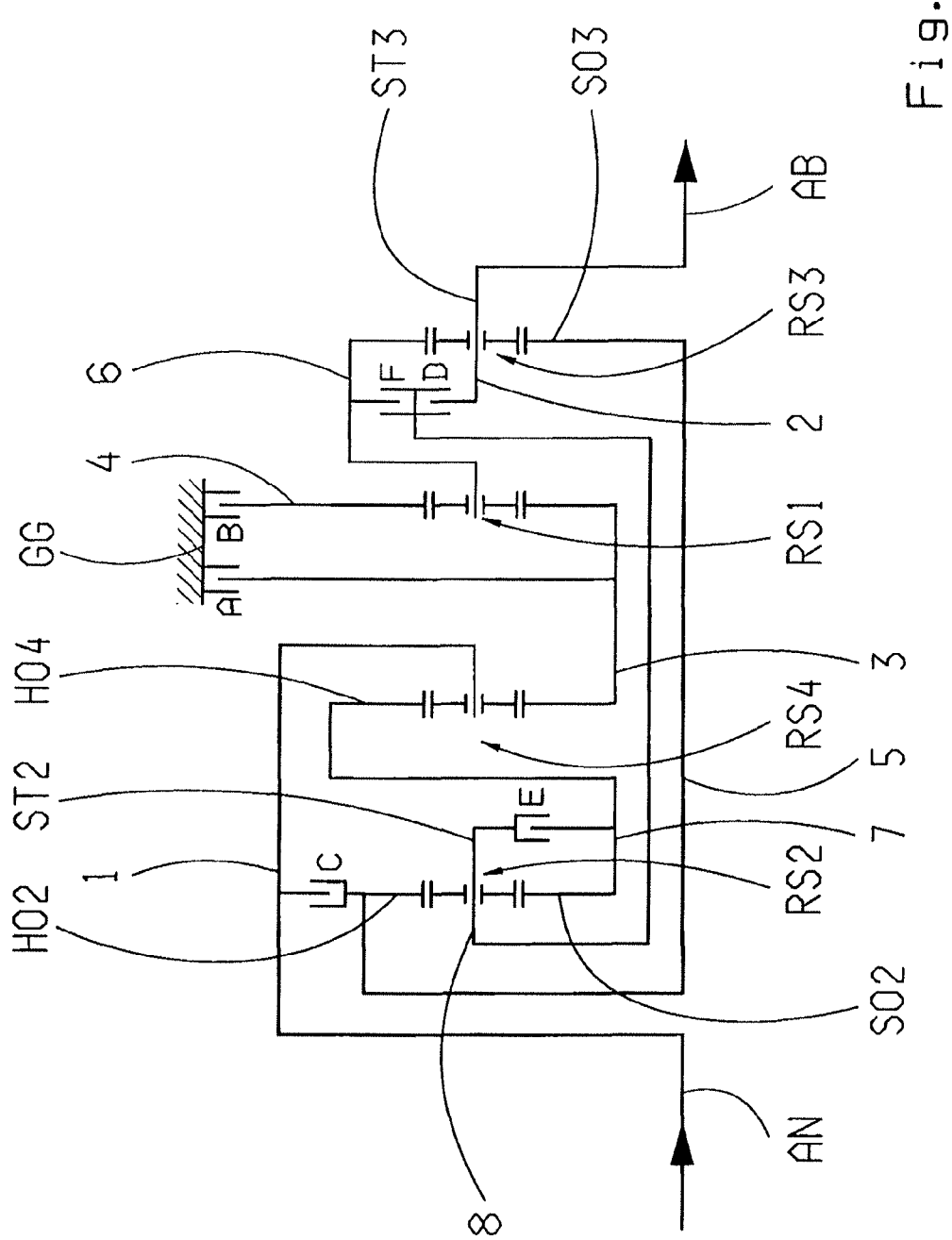
FIG. 13: Schematic representation of a second example embodiment of a 10-gear automatic transmission according to the invention.

Thus, FIG. 13 shows a schematic representation of a second example embodiment of a 10-gear automatic transmission according to the invention. Different than the transmission according to FIG. 12, in the transmission of FIG. 13 it is provided that the clutch E is now arranged in the force flow between the seventh shaft 7 of the transmission and the eighth shaft 8 of the transmission. Thus, according to FIG. 13 the clutch E in its engaged condition connects the sun gear SO2 and the carrier ST2 of the second planetary gearset RS2 to one another and thereby blocks them. The spatial arrangement of the components within the transmission housing GG shown in FIG. 13 is substantially identical to FIG. 12. There are slight differences due to the omission of the common disk carrier C_i/E_a provided in FIG. 12. In FIG. 13 it is provided that the disk set of the clutch E is arranged in an area axially between the two planetary gearsets RS2 and RS4, while the disk set of the clutch C is arranged radially over the second planetary gearset RS2.

Figure 14:
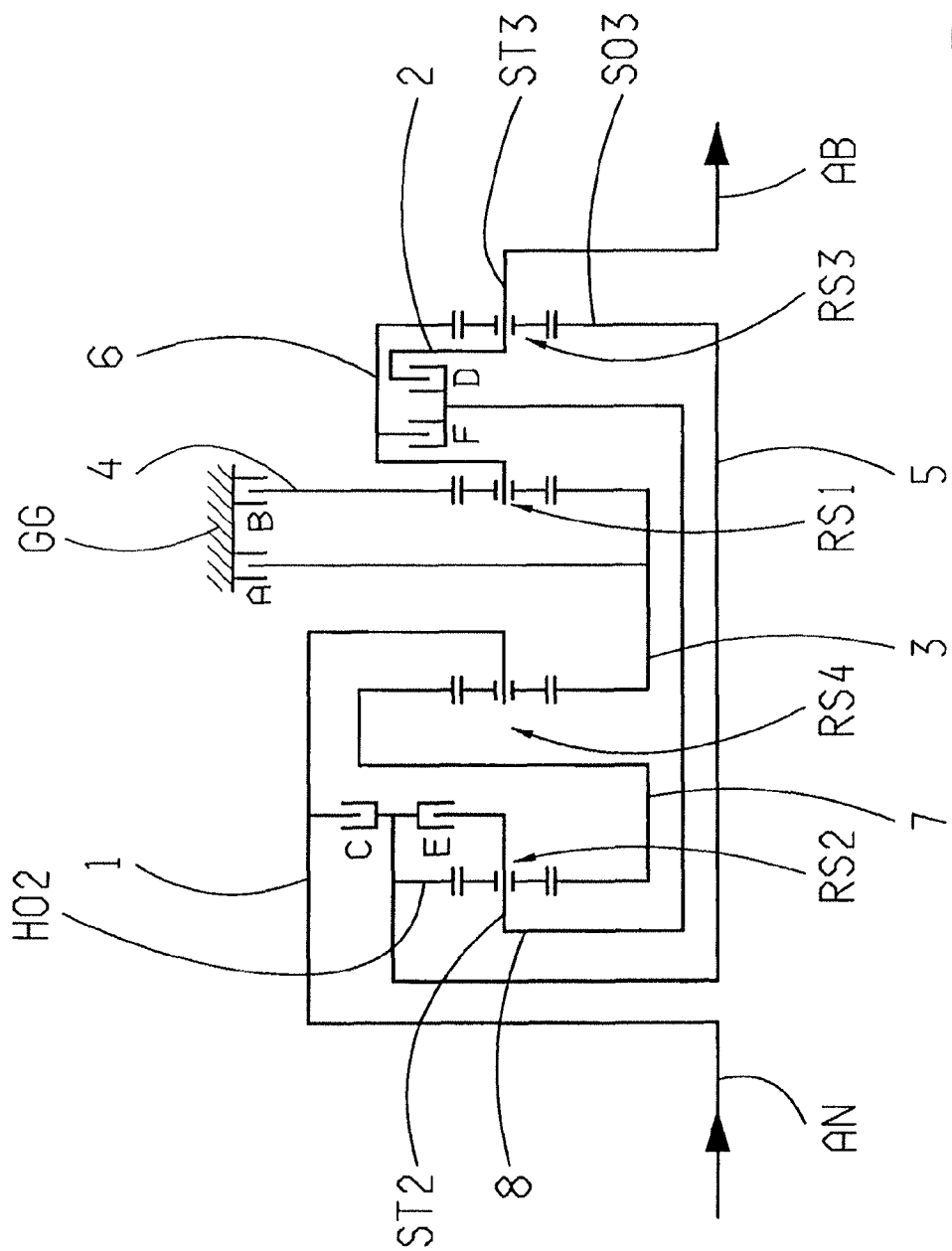
FIG. 14: Schematic representation of a third example embodiment of a 10-gear automatic transmission according to the invention.

Finally, FIG. 14 shows a schematic representation of a third example embodiment of a 10-gear automatic transmission according to the invention. Different than the transmission of FIG. 12, in the transmission according to FIG. 14 it is provided that the clutch E is now positioned in the force flow between the fifth shaft 5 of the transmission and the eighth shaft 8 of the transmission. According to FIG. 14, therefore, the clutch E in its engaged condition connects the ring gear HO2 and the carrier ST2 of the second planetary gearset RS2 to one another and thereby engages them. The spatial arrangement of the components within the transmission housing GG shown in FIG. 14 is substantially identical to FIG. 12. In contrast to FIG. 12 the assembly of the two clutches D, F this time comprises disk sets arranged axially next to one another and a common disk carrier, this time as an example made as the inner disk carrier for both clutches D, F and, as a section of the shaft 8, connected to the carrier ST2 of the second planetary gearset RS2.

Needless to say, a person with knowledge of the field will be able to adopt any of the previously indicated suggestions concerning the design and spatial arrangement of the components of the transmission for use in the example embodiments of a 10-gear automatic transmission according to the invention represented in simplified form in FIGS. 13 and 14. Such a person will also find further suggestions for expedient possible modifications of the transmission concept according to the invention in the type-defining document WO 2006/074707 A1.

INDEXES

1 First shaft
2 Second shaft
3 Third shaft
4 Fourth shaft
5 Fifth shaft
6 Sixth shaft
7 Seventh shaft
8 Eighth shaft
A First shifting element, first brake
A_a Outer disk carrier of the first shifting element
A_i Inner disk carrier of the first shifting element
A_l Disk set of the first shifting element
A_s Servomechanism of the first shifting element
B Second shifting element, second brake
B_a Outer disk carrier of the second shifting element
B_i Inner disk carrier of the second shifting element
B_l Disk set of the second shifting element
B_s Servomechanism of the second shifting element
C Third shifting element, first clutch
C_a Outer disk carrier of the third shifting element
C_i Inner disk carrier of the third shifting element
C_l Disk set of the third shifting element
C_s Servomechanism of the third shifting element
D Fourth shifting element, second clutch
D_a Outer disk carrier of the fourth shifting element
D_i Inner disk carrier of the fourth shifting element
D_l Disk set of the fourth shifting element
D_s Servomechanism of the fourth shifting element
E Fifth shifting element, third clutch
E_a Outer disk carrier of the fifth shifting element
E_i Inner disk carrier of the fifth shifting element
E_l Disk set of the fifth shifting element
E_s Servomechanism of the fifth shifting element
F Sixth shifting element, fourth clutch
F_a Outer disk carrier of the sixth shifting element
F_i Inner disk carrier of the sixth shifting element
F_l Disk set of the sixth shifting element
F_s Servomechanism of the sixth shifting element
AN Drive input shaft
AB Drive output shaft
GG Housing
GN Hub fixed on the housing
GW Housing wall
RS1 First planetary gearset
HO1 Ring gear of the first planetary gearset
SO1 Sun gear of the first planetary gearset
ST1 Carrier of the first planetary gearset
PL1 Planetary gears of the first planetary gearset
RS2 Second planetary gearset
HO2 Ring gear of the second planetary gearset
SO2 Sun gear of the second planetary gearset
ST2 Carrier of the second planetary gearset
PL2 Planetary gears of the second planetary gearset
RS3 Third planetary gearset
HO3 Ring gear of the third planetary gearset
SO3 Sun gear of the third planetary gearset
ST3 Carrier of the third planetary gearset
PL3 Planetary gears of the third planetary gearset
RS4 Fourth planetary gearset HO4 Ring gear of the fourth planetary gearset
SO4 Sun gear of the fourth planetary gearset
ST4 Carrier of the fourth planetary gearset
PL4 Planetary gears of the fourth planetary gearset
i Transmission ratio
φ Gear-step interval

The invention claimed is:

1. Automatic transmission of planetary structure, for a motor vehicle, comprising:
    a drive input shaft;
    a drive output shaft;
    first, second, third and fourth planetary gear sets, and each of the first, the second, the third and the fourth planetary gear sets comprising three elements;
    six shifting elements for achieving ten forward speed ratios and at least one reverse speed ratio,
    wherein the output shaft is permanently connected with one of the elements of the third planetary gear set;
    the input shaft is permanently connected with one of the elements of the fourth planetary gear set;
    a first one of the elements of the first planetary gear set is connectable to the transmission housing by engaging a first one of the six shifting elements;
    a second one of the elements of the first planetary gear set is connectable to the transmission housing by engaging a second one of the six shifting elements;
    one of the elements of the fourth planetary gear set is connectable to the transmission housing;
    a first interconnecting shaft permanently connects one of the elements of the first planetary gear set with one of the elements of the fourth planetary gear set;
    a second interconnecting shaft permanently connects one of the elements of the first planetary gear set with one of the elements of the third planetary gear set; and
    a third interconnecting shaft permanently connects one of the elements of the second planetary gear set with one of the elements of the fourth planetary gear set.

2. The automatic transmission according to claim 1, wherein the three elements of the first planetary gear set comprise a first sun gear, a first planet carrier and a first ring,
    the three elements of the fourth planetary gear set comprise a fourth sun gear, a fourth planet carrier and a fourth ring, and
    the first interconnecting shaft permanently connects the first sun gear of the first planetary gear set with the fourth sun gear of the fourth planetary gear set.

3. The automatic transmission according to claim 1, wherein the three elements of the first planetary gear set comprise a first sun gear, a first planet carrier and a first ring,
    the three elements of the third planetary gear set comprise a third sun gear, a third planet carrier and a third ring, and
    the second interconnecting shaft permanently connects the first planet carrier of the first planetary gear set with the third ring gear of the third planetary gear set.

4. The automatic transmission according to claim 1, wherein the three elements of the second gear set comprise a second sun gear, a second planet carrier and a second ring,
    the three elements of the fourth planetary gear set comprise a fourth sun gear, a fourth planet carrier and a fourth ring, and
    the third interconnecting shaft permanently connects the second sun gear of the second planetary gear set with the fourth ring gear of the elements of the fourth planetary gear set.

5. The automatic transmission according to claim 1, wherein the automatic transmission achieves a hill-holder function by engagement of four of the six shifting elements.

6. The automatic transmission according to claim 1, wherein engagement of one of the six shifting elements facilitates blocking of the second planetary gear set so that all three of the elements of the second planetary gear set rotate in unison with one another.

7. The automatic transmission according to claim 1, wherein the first interconnecting member is connectable to the transmission housing by engaging one of the six shift elements.

8. The automatic transmission according to claim 1, wherein the three elements of the first planetary gear set comprise a first sun gear, a first planet carrier and a first ring,
    the three elements of the second gear set comprise a second sun gear, a second planet carrier and a second ring,
    the three elements of the third planetary gear set comprise a third sun gear, a third planet carrier and a third ring, and
    the three elements of the fourth planetary gear set comprise a fourth sun gear, a fourth planet carrier and a fourth ring.

9. The automatic transmission according to claim 1, wherein a fourth interconnecting shaft permanently connects one of the elements of the second planetary gear set with one of the elements of the third planetary gear set.

10. The automatic transmission according to claim 9, wherein the fourth interconnecting shaft is connectable to the input shaft by engaging one of the six shifting elements.

11. The automatic transmission according to claim 9, wherein one of the elements of the second planetary gear set is permanently connected with two of the six shifting elements.

12. The automatic transmission according to claim 9, wherein a planet carrier of the second planetary gear set is permanently connected with two of the six shifting elements.

13. The automatic transmission according to claim 9, wherein the fourth interconnecting shaft permanently connects a ring gear of the second planetary gear set with a sun gear of the third planetary gear set.

14. The automatic transmission according to claim 13, wherein the fourth interconnecting shaft is connectable to the input shaft by engaging one of the six shifting elements.

* * * * *